US012345587B2

(12) United States Patent
Kakaley et al.

(10) Patent No.: US 12,345,587 B2
(45) Date of Patent: Jul. 1, 2025

(54) HANGER BEARING MOUNTED TORQUE SENSOR

(71) Applicant: LORD Corporation, Cary, NC (US)

(72) Inventors: Daniel E. Kakaley, Cary, NC (US); Scott Kennedy, Durham, NC (US); Charles A. Clifton, Cary, NC (US); William Arlendo Smith, Holly Springs, NC (US); Gary Martin, Raleigh, NC (US); Russell E. Altieri, Holly Springs, NC (US); Douglas Swanson, Cary, NC (US)

(73) Assignee: LORD Corporation, Cary, NC (US)

( * ) Notice: Subject to any disclaimer, the term of this patent is extended or adjusted under 35 U.S.C. 154(b) by 503 days.

(21) Appl. No.: 17/716,563

(22) Filed: Apr. 8, 2022

(65) Prior Publication Data

US 2022/0228934 A1 Jul. 21, 2022

Related U.S. Application Data

(63) Continuation of application No. PCT/US2020/055018, filed on Oct. 9, 2020.

(60) Provisional application No. 62/912,900, filed on Oct. 9, 2019.

(51) Int. Cl.
*G01L 3/10* (2006.01)
(52) U.S. Cl.
CPC .................... *G01L 3/101* (2013.01)
(58) Field of Classification Search
CPC ........................................... G01L 3/101
USPC .......................................................... 73/218
See application file for complete search history.

(56) References Cited

U.S. PATENT DOCUMENTS

| 4,881,414 | A | * | 11/1989 | Setaka | G01L 3/104 |
| | | | | | 73/862.331 |
| 5,228,349 | A | * | 7/1993 | Gee | G01P 3/565 |
| | | | | | 324/207.25 |
| 5,345,827 | A | * | 9/1994 | Brassert | G01L 3/205 |
| | | | | | 73/862.15 |
| 5,526,704 | A | * | 6/1996 | Hoshina | G01L 3/105 |
| | | | | | 73/862.333 |

(Continued)

FOREIGN PATENT DOCUMENTS

KR     20140005061 A   *   1/2014

OTHER PUBLICATIONS

Translation of KR-20140005061-A (Year: 2014).*
International Search Report and Written Opinion for Application No. PCT/US2020/055018 dated Jan. 19, 2021.

*Primary Examiner* — Nathaniel T Woodward
(74) *Attorney, Agent, or Firm* — KDW FIRM PLLC

(57) ABSTRACT

Torque sensing devices, systems, and methods are capable of measuring and/or determining a torque being transmitted through a shaft by measuring the torsional deformation of the shaft over a short length thereof. Such devices, systems, and devices have a sensor positioned adjacent to the outer surface of the shaft as it rotates, the sensor being positioned to maintain a substantially constant distance between the sensor and the outer surface of the shaft. The sensors may be variable reluctance (VR) sensors rigidly attached to a frame mounted on a bearing (e.g., a hanger bearing), which is mounted on the shaft, such that relative radial motion between the shaft and the VR sensor is minimized (e.g., so that they move in unison). Reducing this amount of motion results in a more accurate torque measurement.

19 Claims, 29 Drawing Sheets

(56) References Cited

U.S. PATENT DOCUMENTS

| | | | |
|---|---|---|---|
| 6,382,034 B1* | 5/2002 | Yasui | G01L 3/104 |
| | | | 180/444 |
| 7,093,504 B2 | 8/2006 | Southward | |
| 2018/0178340 A1* | 6/2018 | Khosla | G01L 3/1457 |
| 2022/0228934 A1* | 7/2022 | Kakaley | G01L 3/104 |

* cited by examiner

HANGER BEARING MOUNTED TORQUE SENSOR

CROSS-REFERENCE TO RELATED APPLICATIONS

This application is a continuation of and claims priority to International Patent Application No. PCT/US2020/055018, which was filed on Oct. 9, 2020, and which claimed priority to U.S. Provisional Patent Application Ser. No. 62/912,900, filed Oct. 9, 2019, the disclosures of which are incorporated by reference herein in their entireties.

TECHNICAL FIELD

The subject matter disclosed herein relates to torque measurement, as well as associated methods of use and manufacture thereof.

BACKGROUND

Methods for torque measurement using variable reluctance (VR) sensors to measure twist across a shaft segment are well-known. Typically, a reference tube is used in conjunction with ferrous target teeth to assess twist across a length of shaft. Variable reluctance (VR) sensors are employed to measure changes in the timing of pulses produced by the passage of the ferrous targets. Twist in the shaft can be related to the relative change in pulse timing. Then, by knowing the torsional spring rate of the shaft, torque can be derived from twist.

Existing torque sensing systems are known to be, in many applications, prohibitively complicated, expensive, and large when there exists a large gap between the target region (e.g., the outer circumferential surface) of the shaft and the sensor(s), for example, a gap above about 0.5 inches. In designing such known torque sensing systems, the maximum radial deflection of the shaft at the location along its length where the sensor is to be located must be determined and the sensor must be positioned at least that distance away from the shaft in the radial direction in order to ensure that the shaft does not strike the sensor during operation. An algorithm may be used in aiding in accuracy of such known torque sensing systems by compensating for all of the various motions of the shaft, relative to the sensor, during normal operation. This radial gap between the sensor(s) and the rotating shaft is the predominant factor associated with the inherent inaccuracy of such known systems. One presently known solution for reducing the gap between the sensors and the shaft is to stiffen the drivetrain and the structure to which the drivetrain is attached (e.g., a fixed structure, such as a frame) so that the gap between the fixed frame components (e.g., the sensors and fixed structure) and the rotating frame components (e.g., the shaft) is reduced. However, this is typically not a priority in aircraft design or may pose integration challenges.

Many different Torque technologies are limited by the operating gap between the fix frame sensor and the rotating shaft. VR sensor/target Technology has a large sensor amplitude and phase changes over operating gap variations which must be compensated for in order for such systems to be operable. Magnetoelastic torque sensors mildly magnetize the shaft material and would also see sensor coil amplitude dramatically change over operating gaps, and perhaps not work at all at large gaps. Magnetic ring phase shift technology using fixed frame sensing coils would also see large amplitude and phase changes over operating gap variations, which must be compensated for in order for such systems to be operable. Strain gauge base sensors need to communicate data across the operating gap with technologies such as near field communication, as well as transmit power across to the rotating frame. Near field communication and power transmission can be difficult to manage at gaps above 0.5 inches.

There is a need to provide highly accurate twist measurement on a rotating shaft as well as multi-axis shaft motion with a light-weight and minimally invasive solution. Monopole VR sensor-based solutions are light weight and minimally invasive but have limitations in terms of provided twist measurement accuracy. Conventional multi-plane sensing solutions are able to provide high twist accuracy as well as measurement of additional shaft motions, but typically require more than six VR sensors disposed across multiple measurement planes and can present integration challenges. The presently disclosed subject matter is directed towards a torque sensing architecture that addresses such disadvantages known from conventional systems.

SUMMARY

The presently disclosed subject matter provides devices, systems, and/or methods for accurately measuring safety critical torque and speed (e.g., angular speed) of a flexible drivetrain suspended in a compliant manner from a sufficiently fixed structure in and/or on which the flexible drivetrain is installed and/or associated with. As used here, the term "fixed structure is generally used to refer to a frame element or other structural element that is rigidly attached to and/or integrally formed with, the structure in and/or on which the flexible drivetrain is installed. Non-limiting examples of structures in which such a flexible drivetrain may be installed include aircraft (e.g., helicopters, airplanes, and the like), boats/ships, motor vehicles, and heavy machinery, which can be mobile and/or stationary. In some embodiments, the flexible drivetrain is suspended by hanger bearings compliantly mounted to the fixed structure, such that the hanger bearings, as well as the drivetrain components to which the hanger bearings are attached, are capable of movement relative to the fixed structure.

By mounting a sensor to a frame rigidly attached to a bearing supporting the drivetrain, the bearing being substantially incapable of radial movement relative to the drivetrain component to which it is attached, the gap (e.g., as measured in the radial direction of the shaft or other rotary component of the flexible drivetrain) between the sensor (e.g., attached to the bearing frame) and a target region of the drivetrain is minimized (e.g., on the order of about 0.02 inches) compared to gaps between sensors and the rotatable shaft in conventionally known torque sensing systems. For such conventionally known devices, systems, and methods using flexible drivetrains, the gaps between the drivetrain and non-hanger bearing components (e.g., the sensor, or sensors) can be on the order of 0.5 inches or more, which leads to significant error in such conventionally known torque sensing devices, systems, and methods. As such, the significant reduction of the gap between the sensor(s) and the target region allows the presently disclosed devices, systems, and methods to be considerably more accurate than such conventionally known devices, systems, and/or methods. While minimizing the gap between the shaft and the sensor(s) removes the error associated with the presence of the gap, the fact that the gap is so small is also known to potentially introduce some errors due to the fact that minimal shaft motion can be tolerated, resulting in a smaller twisting section of the shaft (e.g., less than 0.2 degrees), which means that the twist measurement must be extremely precise to determine torque with such a small amount of total twist.

In an example embodiment, a system for sensing torque in a rotatable shaft is provided. According to this example embodiment, the system comprises: a target region extending along at least a portion of a length of the shaft; at least one sensor configured to measure a torque transmitted through the shaft over the target region; a bearing having an inner race and an outer race, the inner race being supported by, and in contact with, an outer surface of the shaft, such that the inner race and the shaft are rotatably locked together; a frame fixedly mounted to the outer race of the bearing, such that the frame maintains a substantially constant radial distance from the shaft; and a compliant mount configured to attach the frame to a fixed structure, such that the frame is configured to move substantially in unison with the shaft, relative to the fixed structure, in at least two dimensions, the at least two dimensions being in a plane perpendicular to a longitudinal axis of the shaft; wherein the shaft is configured to rotate relative to the frame; and wherein the at least one sensor is rigidly attached to the frame, such that a gap between the at least one sensor and the outer surface of the shaft in the target region is substantially constant.

In some embodiments of the system, the target region comprises a first set of target elements and a second set of target elements, wherein the first set of target elements are attached to the outer surface of the shaft at a first position, wherein the second set of target elements are attached to the outer surface of the shaft at a second position, wherein the first and second positions are spaced apart, within the target region, from each other along the longitudinal axis of the shaft, wherein the first and second sets of target elements are interleaved with each other, and wherein the at least one sensor is configured to measure a distance between adjacent target elements of the first and/or second sets of target elements.

In some embodiments of the system, the first set of target elements extend towards the second set of target elements, such that at least a portion of each target element of the first set of target elements is positioned within a same plane as the second set of target elements.

In some embodiments of the system, the first set of target elements and the second set of target elements extend in a same direction and overlap each other at the at least one sensor.

In some embodiments of the system, the plane is substantially perpendicular to the longitudinal axis of the shaft and defines a deflection region, where the at least one sensor is fixedly positioned to measure the distance between adjacent target elements of the first and second sets of target elements.

In some embodiments of the system, the first and second sets of target elements extend towards each other along the longitudinal axis of the shaft and overlap each other in a deflection region, which is between the first and second positions, such that at least a portion of each target element of the first and second sets of target elements is positioned within a same plane.

In some embodiments of the system, the plane is substantially perpendicular to the longitudinal axis of the shaft, and wherein the at least one sensor is fixedly positioned to measure the distance between adjacent target elements of the first and second sets of target elements.

In some embodiments of the system, the at least one sensor comprises a variable reluctance (VR) sensor.

In some embodiments of the system, the VR sensor is configured to detect the distance between adjacent target elements of the first and second sets of target elements induced upon torsional deformation of the shaft.

In some embodiments of the system, the first and second sets of target elements are interleaved in an alternating pattern, and wherein the distance between adjacent target elements is measured in the circumferential direction of the shaft.

In some embodiments of the system, the at least one sensor comprises a plurality of VR sensors spaced apart from each other circumferentially around the shaft.

In some embodiments of the system, the compliant mount is configured such that the shaft, the bearing, and the frame are movable in at least three dimensions relative to the fixed structure.

In some embodiments of the system, the target region comprises a first set of target elements and a second set of target elements, each of which are arranged about the shaft in a circumferential direction thereof, wherein the first set of target elements are on the outer surface of the shaft at a first position, wherein the second set of target elements are attached to the outer surface of the shaft at a second position.

In some embodiments of the system, the at least one sensor comprises at least a first sensor and a second sensor, both of which are variable reluctance (VR) sensors.

In some embodiments of the system, the first sensor is attached to the frame over the first position, wherein the second sensor is attached to the frame over the second position, and wherein the system is configured to detect a change in relative position in the circumferential direction between the first and second sets of target elements induced upon torsional deformation of the shaft.

In some embodiments of the system, the first position and the second position are spaced apart by a majority of a length of the shaft.

In some embodiments of the system, the first sensor is rigidly attached to the frame, such that the first sensor is positioned over the first position; a second bearing is attached to the shaft, adjacent the second position; a second frame is mounted to the second bearing in a fixed manner, such that the second frame maintains a substantially constant radial distance from the shaft; the second sensor is rigidly attached to the second frame, such that the second sensor is positioned over the second position; and the system is configured to detect a change in relative position in the circumferential direction between the first and second sets of target elements induced upon torsional deformation of the shaft.

In some embodiments of the system, the bearing comprises an inner race and an outer race, the inner race being supported by, and in contact with, the outer surface of the shaft, such that the inner race of the second bearing and the shaft are rotatably locked together.

In some embodiments, the system comprises a second compliant mount that attaches the second frame to the fixed structure, such that the second frame is movable, substantially in unison with the shaft, relative to the fixed structure, in at least two dimensions, the at least two dimensions being in a plane perpendicular to the longitudinal axis of the shaft.

In some embodiments of the system, the second frame is attached to the fixed structure via the compliant mount, such that the second frame is movable, substantially in unison with the shaft, relative to the fixed structure, in at least two dimensions, the at least two dimensions being in a plane perpendicular to the longitudinal axis of the shaft.

In some embodiments of the system, the target region is a magnetized portion of the outer surface of the shaft configured to generate a magnetic field, and wherein the at least one sensor is configured to detect a change in the magnetic field induced by shear within the outer surface of the shaft, the shear corresponding to torsional deformation of the shaft over at least a portion of the target region due to twisting.

In some embodiments of the system, the at least one sensor is configured to detect the change in the magnetic field when the shaft is substantially stationary.

In some embodiments of the system, the bearing comprises a redundant bearing.

In some embodiments of the system, the target region comprises a first set of target elements and a second set of target elements; the first set of target elements comprise magnets that are attached to the outer surface of the shaft at a first position and are spaced about the shaft in the circumferential direction such that adjacent magnets of the first set of target elements have different polarities from each other; the second set of target elements comprise magnets that are attached to the outer surface of the shaft at a second position and are spaced about the shaft in the circumferential direction such that adjacent magnets of the second set of target elements have different polarities from each other; the first and second positions are spaced apart, within the target region, from each other along the longitudinal axis of the shaft; the at least one sensor comprises at least a first sensor, which is arranged at the first position to detect a magnetic field produced by the magnets of the first set of target elements, and a second sensor, which is arranged at the second position to detect a magnetic field produced by the magnets of the second set of target elements; and the system is configured to determine, based on a relative phase shift of the magnetic fields produced by the magnets of the first and second sets of target elements due to a torsional deformation of the shaft between the first and second sets of target elements, respectively, the torque being transmitted through the rotatable shaft.

In some embodiments of the system, the magnets of the first set of target elements are adjacent to each other to form a ring of magnets about the shaft at the first position and/or wherein the magnets of the second set of target elements are adjacent to each other to form a ring magnets about the shaft at the second position.

In some embodiments of the system, the magnets of the first set of target elements are in direct contact with each other to form a substantially continuous and uninterrupted ring of magnets about the shaft at the first position and/or wherein the magnets of the second set of target elements are in direct contact with each other to form a substantially continuous and uninterrupted ring of magnets about the shaft at the second position.

According to another example embodiment, a method for sensing torque in a rotatable shaft is provided. According to this example embodiment, the method comprises: providing a target region extending along at least a portion of a length of the shaft; attaching a bearing to the shaft, the bearing having an inner race and an outer race, wherein the inner race is supported by, and in contact with, an outer surface of the shaft, such that the inner race and the shaft are rotatably locked together; mounting a frame to the outer race of the bearing in a fixed manner, such that the frame maintains a substantially constant radial distance from the shaft; attaching, via a compliant mount, the frame to a fixed structure, such that the frame is movable, substantially in unison with the shaft, relative to the fixed structure, in at least two dimensions, the at least two dimensions being in a plane perpendicular to a longitudinal axis of the shaft; rigidly attaching at least one sensor to the frame, such that a gap between the at least one sensor and the outer surface of the shaft in the target region is substantially constant; and measuring a torsional deformation of the shaft over the target region.

In some embodiments, the method comprises: providing a first set of target elements in and/or on the outer surface of the shaft at a first position within the target region; and providing a second set of target elements in and/or on the outer surface of the shaft at a second position within the target region; wherein the first and second positions are spaced apart, within the target region, from each other along the longitudinal axis of the shaft; and wherein the first and second sets of target elements are interleaved with each other.

In some embodiments, the method comprises measuring, using the at least one sensor, a distance between adjacent target elements of the first and/or second sets of target elements.

In some embodiments of the method, the first set of target elements extend towards the second set of target elements, such that at least a portion of each target element of the first set of target elements is positioned within a same plane as the second set of target elements.

In some embodiments of the method, the plane is substantially perpendicular to the longitudinal axis of the shaft and defines a deflection region, where the at least one sensor is fixedly positioned to measure the distance between adjacent target elements of the first and second sets of target elements.

In some embodiments of the method, the first and second sets of target elements extend towards each other along the longitudinal axis of the shaft and overlap each other in a deflection region, which is between the first and second positions, such that at least a portion of each target element of the first and second sets of target elements is positioned within a same plane.

In some embodiments of the method, the plane is substantially perpendicular to the longitudinal axis of the shaft, and wherein the at least one sensor is fixedly positioned to measure the distance between adjacent target elements of the first and second sets of target elements.

In some embodiments of the method, the first set of target elements and the second set of target elements extend in a same direction and overlap each other at the at least one sensor.

In some embodiments of the method, the at least one sensor comprises a variable reluctance (VR) sensor.

In some embodiments, the method comprises detecting, using the VR sensor, the distance between adjacent target elements of the first and second sets of target elements induced upon torsional deformation of the shaft.

In some embodiments of the method, the first and second sets of target elements are interleaved in an alternating pattern, and wherein the distance between adjacent target elements is measured in the circumferential direction of the shaft.

In some embodiments of the method, the at least one sensor comprises a plurality of VR sensors spaced apart from each other circumferentially around the shaft.

In some embodiments of the method, the compliant mount allows the shaft, the bearing, and the frame to move in at least three dimensions relative to the fixed structure.

In some embodiments, the method comprises: providing a first set of target elements in and/or on the outer surface of the shaft at a first position within the target region, such that target elements of the first set of target elements are arranged circumferentially about the shaft; and providing a second set of target elements in and/or on the outer surface of the shaft at a first position within the target region, such that target elements of the first set of target elements are arranged circumferentially about the shaft.

In some embodiments of the method, the at least one sensor comprises at least a first sensor and a second sensor, both of which are variable reluctance (VR) sensors.

In some embodiments, the method comprises: attaching the first sensor to the frame over the first position; attaching the second sensor to the frame over the second position; and detecting a change in relative position in the circumferential direction between the first and second sets of target elements induced upon torsional deformation of the shaft.

In some embodiments of the method, the first position and the second position are spaced apart by a majority of a length of the shaft In some embodiments, the method comprises: rigidly attaching the first sensor to the frame, such that the first sensor is positioned over the first position; attaching a second bearing to the shaft, adjacent the second position; mounting a second frame to the second bearing in a fixed manner, such that the second frame maintains a substantially constant radial distance from the shaft; rigidly attaching the second sensor to the second frame, such that the second sensor is positioned over the second position; and detecting a change in relative position in the circumferential direction between the first and second sets of target elements induced upon torsional deformation of the shaft.

In some embodiments of the method, the bearing comprises an inner race and an outer race, the inner race being supported by, and in contact with, the outer surface of the shaft, such that the inner race of the second bearing and the shaft are rotatably locked together.

In some embodiments, the method comprises attaching, via a second compliant mount, the second frame to the fixed structure, such that the second frame is movable, substantially in unison with the shaft, relative to the fixed structure, in at least two dimensions, the at least two dimensions being in a plane perpendicular to the longitudinal axis of the shaft.

In some embodiments, the method comprises attaching, via the compliant mount, the second frame to the fixed structure, such that the second frame is movable, substantially in unison with the shaft, relative to the fixed structure, in at least two dimensions, the at least two dimensions being in a plane perpendicular to the longitudinal axis of the shaft.

In some embodiments, the method comprises: providing a magnetized portion of the outer surface of the shaft in the target region; generating a magnetic field adjacent to the magnetized portion; transmitting a torque through the shaft to induce shear within the outer surface of the shaft, wherein the magnetic field changes due to the shear, which corresponds to torsional deformation of the shaft over at least a portion of the target region due to twisting; and detecting, using the at least one sensor, a change in the magnetic field.

In some embodiments of the method, the shaft is substantially stationary when the at least one sensor is detecting the change in the magnetic field.

In some embodiments of the method, the bearing comprises a redundant bearing.

In some embodiments of the method, the target region comprises a first set of target elements and a second set of target elements; the first set of target elements comprise magnets that are attached to the outer surface of the shaft at a first position and are spaced about the shaft in the circumferential direction such that adjacent magnets of the first set of target elements have different polarities from each other; the second set of target elements comprise magnets that are attached to the outer surface of the shaft at a second position and are spaced about the shaft in the circumferential direction such that adjacent magnets of the second set of target elements have different polarities from each other; the first and second positions are spaced apart, within the target region, from each other along the longitudinal axis of the shaft; the at least one sensor comprises at least a first sensor, which is arranged at the first position to detect a magnetic field produced by the magnets of the first set of target elements, and a second sensor, which is arranged at the second position to detect a magnetic field produced by the magnets of the second set of target elements; and the system is configured to determine, based on a relative phase shift of the magnetic fields produced by the magnets of the first and second sets of target elements due to a torsional deformation of the shaft between the first and second sets of target elements, respectively, the torque being transmitted through the rotatable shaft.

In some embodiments of the method, the magnets of the first set of target elements are adjacent to each other to form a ring of magnets about the shaft at the first position and/or wherein the magnets of the second set of target elements are adjacent to each other to form a ring magnets about the shaft at the second position.

In some embodiments of the method, the magnets of the first set of target elements are in direct contact with each other to form a substantially continuous and uninterrupted ring of magnets about the shaft at the first position and/or wherein the magnets of the second set of target elements are in direct contact with each other to form a substantially continuous and uninterrupted ring of magnets about the shaft at the second position.

BRIEF DESCRIPTION OF THE DRAWINGS

FIG. 8 is an isometric view of a shaft suspended by a compliantly-mounted (e.g., "floating") bearing mounted to a fixed structure in and/or on which the shaft is installed, attached to, and/or associated with.

DETAILED DESCRIPTION

Figure 1:
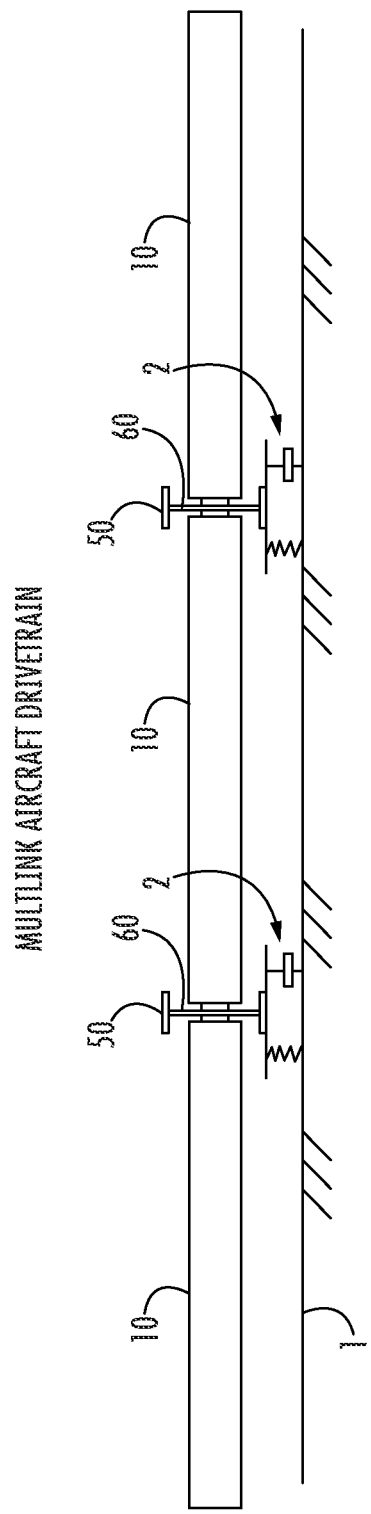
FIG. 1 is a schematic side view of multilink drivetrain, including a plurality of longitudinally-extending shafts, which are assembled together at flexible joints ("flexjoints") and supported by compliantly-mounted bearings attached to a fixed structure, the multilink drivetrain being capable of transmitting torque.

FIG. 1 is a side view of an example embodiment of a multilink drivetrain, such as is suitable for use in virtually any machine that transmits torque through a rotatable shaft. For example, such multilink drivetrains are typically used in aircraft, particularly in helicopters. In helicopters, there are generally at least two rotary outputs, or propellers, which are spaced apart from each other along the length of the body of the helicopter. As shown in FIG. 1, the multilink drivetrain has a plurality of rotatable shafts 10 that are connected together axially (e.g., in an end-to-end configuration) to transmit torque therebetween, from one end of the drivetrain to the opposite end of the drivetrain. The shafts 10 are supported, either along the lengths of the shafts themselves (e.g., at a point between the ends of a shaft) and/or between adjacent shafts 10, by bearings 60, which have a housing, or frame 50, which is connected to a support structure 1 by a compliant mount 2. The compliant mount 2 can have, for example, spring and/or damping characteristics and can be made of any suitable material. As such, the bearings 60 can "float" (e.g., move transversely to) relative to the support structure 1 via the compliant mount(s) 2, thereby allowing each shaft 10, as well as the bearing(s) 60 and frame(s) 50 attached thereto, to move in unison relative to the support structure in two or more directions (e.g., in the plane perpendicular to the longitudinal axis of the undeflected shaft(s) 10). In some embodiments, the shaft(s) 10, bearing(s) 60 and frame(s) 50 can move in unison relative to the support structure in three or more directions (e.g., including in the direction of the longitudinal axis of the undeflected shaft(s) 10). As used hereinabove, the term "direction" can be the same as a "degree of freedom." Additionally, the term "move in unison" allows for relative movement between the shaft(s) 10, bearing(s) 60, and frame(s) 50 due to tolerances introduced during assembly and under structural deflections during operation, which is inherent in virtually any rotatable connection using a bearing 60. The bearing 60 can be of any suitable type, including, for example, ball bearing, roller bearing, journal bearing, squeeze-film bearing, and the like, depending on the degree of precision desired in allowed relative movement between the shaft 10 and the frame 50 of the bearing 60 and also the expected service life and/or interval of the drivetrain.

Figure 2:
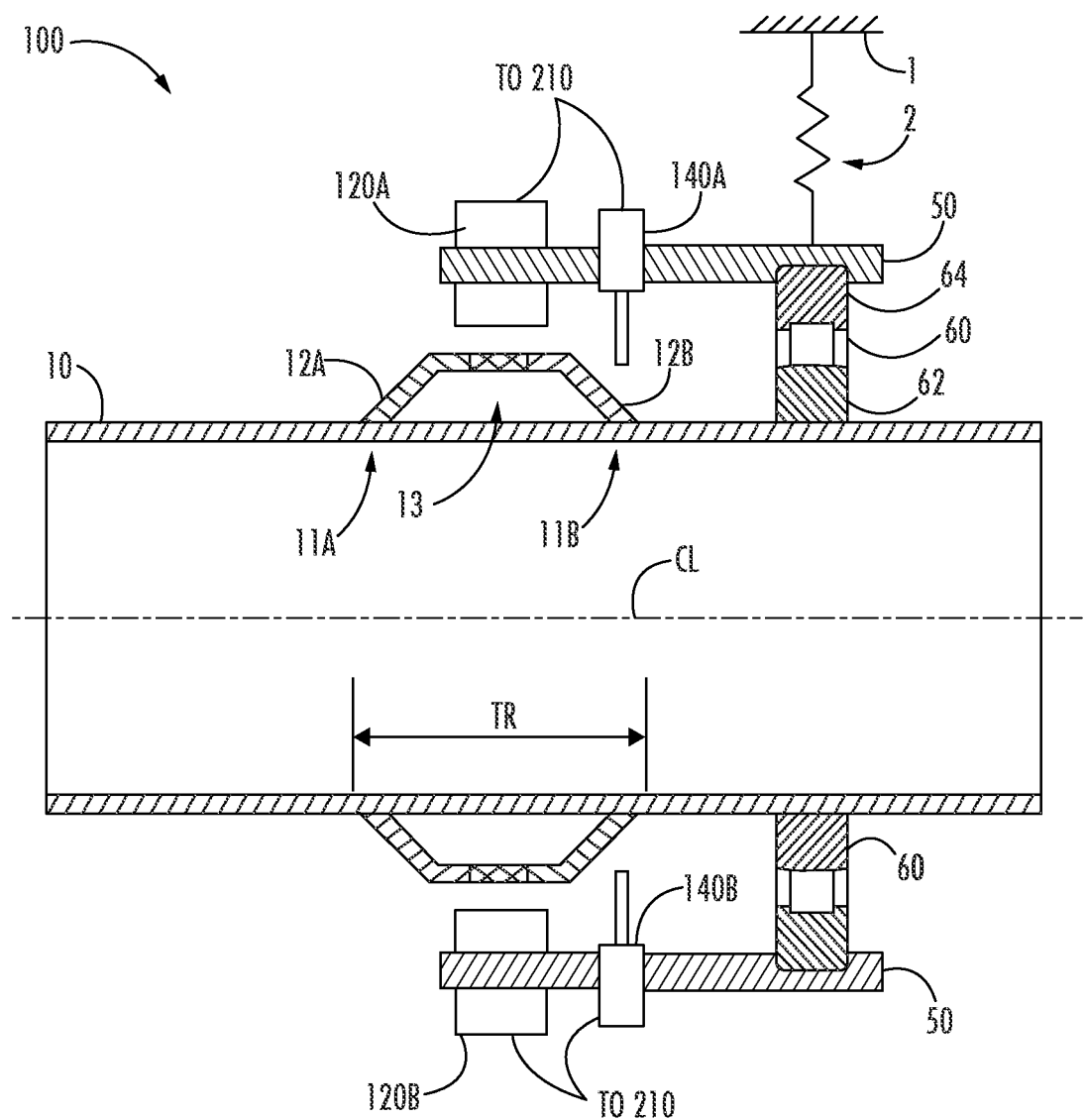
FIG. 2 is a cross-sectional view of an example embodiment of a system for sensing torque transmitted through a rotatable shaft via a monopole torque sensor architecture rigidly attached to a bearing that is attached to a fixed structure in a compliant manner and supports the shaft to allow radial movement of the shaft and bearing relative to the fixed structure to which the bearing is attached.

The presently disclosed torque sensing devices and systems generally comprise at least several components with the purpose of measuring torque on a drivetrain component (such as, for example, a rotatable shaft). Such devices and systems generally include a shaft with a target region extending axially along at least a portion of the length of the shaft, so that, as torque is transmitted through the shaft, there is a detectable shift (e.g., of an electrical, magnetic, physical, and/or mechanical) over some or all of the target region of the shaft. FIG. 2 shows an example embodiment of a torque sensing system, generally designated 100. As shown, the system 100 includes a rotatable shaft 10, which has a plurality of target elements 12A, 12B attached to an outer surface thereof and spaced apart from each other in the circumferential direction of the shaft 10 (e.g., in the plane perpendicular to centerline CL). In the example embodiment shown, the target elements 12A, 12B can be referred to as "teeth". The target elements 12A, 12B can be any suitable type of fiducial attached to the shaft 10, so long as the fiducial is detectable by a sensor (e.g., 120A, 120B). The system 100 includes a first set of target elements 12A that are rigidly attached to the outer circumferential surface of the shaft 10 at a first position 11A. The system also includes a second set of target elements 12B that are rigidly attached to the outer circumferential surface of the shaft 10 at a second position 11B.

In the example embodiment shown, the first set of target elements 12A are offset in the circumferential direction from the second set of target elements 12B, such that the target elements of the first set of target elements 12A are interleaved with the target elements of the second set of target elements 12B. As such, the target elements of the first and second sets of target elements 12A, 12B are arranged circumferentially about the shaft in an alternating pattern. While the spacing pattern between adjacent target elements of the first and second sets of target elements 12A, 12B may be any suitable pattern, in the example embodiment shown the spacing is uniform, such that a gap between each target element is substantially identical when the shaft is not being twisted (e.g., torsionally deformed) over the target region TR.

The target elements of the first set of target elements 12A extend away from the first position 11A towards the target elements of the second set of target elements 12B. Similarly, the target elements of the second set of target elements 12B extend away from the second position 11B towards the target elements of the first set of target elements 12A. The first and second target elements 12A, 12B are interleaved with each other so that at least a portion of each target element of the first set of target elements 12A overlaps in the axial direction of the shaft 10 with at least a portion of each target element of the second set of target elements 12B to define a deflection region 13. While the example embodiment disclosed herein has target elements that are substantially aligned with (e.g., parallel to) each other, in some embodiments, the target elements may be inclined relative to each other. In some embodiments, the target elements may be oriented parallel to each other but inclined relative to the centerline CL of the shaft 10, such that, if an imaginary line having a constant radial distance from the outer surface of the shaft 10 were extended from each target element, in the direction of extension thereof, each such imaginary line would wrap helically about the shaft 10.

The system 100 also has one or more sensors 120A, 120B arranged at respective radial positions about the shaft 10 to measure a change in the gap, measured in the circumferential distance of the shaft 10, between adjacent target elements. In the example embodiment shown, the system 100 has a plurality of (e.g., two or more) sensors 120A, 120B that are arranged about the shaft 10 such that the first sensor 120A is spaced apart from the second sensor 120B in the circumferential direction. The sensors 120A, 120B are variable reluctance (VR) sensors in the example embodiment shown, but any sensor type(s) capable of detecting a change in the gap (e.g., distance, but over an arcuate shape or path) in the radial direction between two adjacent target elements can be used without deviating from the scope of the subject matter disclosed herein. In some embodiments a single sensor (e.g., 120A) could be used. Regardless of the number of sensors 120A, 120B included in the system 100, the sensors 120A, 120B are provided to measure the phase shifting of adjacent target elements of the first and second sets of target elements 12A, 12B to measure the torsional deformation of the shaft over the target region TR.

The sensors 120A, 120B are attached to a frame 50, which is radially supported on and/or by a bearing 60, which is in contact with (e.g., direct or indirect contact) the outer surface of the shaft 10. The bearing 60 may be of any suitable type, including, for example, ball bearing, roller bearing, journal bearing, and the like. The bearing 60 has an inner race 62 that is in contact with the outer surface of the shaft 10, such that the inner race 62 is radially locked to the shaft 10. As such, the inner race 62 co-rotates at a same, or substantially similar, angular velocity or speed as the shaft 10. The outer race 64 is rotationally decoupled from the shaft 10, such that the shaft 10 is capable of rotating freely independent of the angular position or velocity of the outer race 64. The outer race 64 is rigidly attached to a frame 50, to which one or more of the sensor(s) 120A, 120B are rigidly attached. While tolerances of the bearing 60 may allow for minimal radial deflection of the outer race 64 relative to the shaft 10, the outer race 64, the frame 50 attached thereto, and the sensor(s) 120A, 120B attached to the frame 50 are substantially positionally fixed in the radial direction relative to the shaft 10.

In some example embodiments, such bearings 60 can have small radial clearances which can reduce gaps from about 0.5 inches to about 0.005 inches. It is advantageous to select a bearing 10 with sufficient tolerances to maintain a radial distance between the target elements and the sensors 120A, 120B of no more than 0.02 inches. By selecting such a bearing 60 as described herein, the radial distance between the target elements and the sensors 120A, 120B can be reduced to a value where relative motion is not really occurring between the shaft 10 and sensor(s) 120A, 120B (e.g., except for rotation about centerline CL), and a plurality of sensors 120A, 120B can be used to enable greater accuracy of the torque sensing capabilities of the system 100. The distance between the sensors 120A, 120B and the target elements is the primary source of error in conventionally known torque sensors that have large gaps (e.g., greater than about 0.5 inches). However, whenever this radial distance is decreased, the overall observable twist, or torsional deformation, of the shaft 10 necessarily decreases. As such, the primary factor for the accuracy of the torque sensing devices, systems, and methods using VR technology, as disclosed herein in some example embodiments, is the resolution of the change in gap between adjacent target elements.

As such, the sensor(s) 120A, 120B are fixed at a substantially constant radial distance from the shaft 10 and also from the target elements of the first and second sets of target elements 12A, 12B in the deflection region 13. As such, any radial deflections of the shaft 10 during operation will also occur in substantially the same magnitude and the same direction for the sensor(s) 120A, 120B, so that the sensor(s) 120A, 120B are essentially static relative to the shaft 10 as the shaft 10 rotates substantially about centerline CL. The sensor(s) 120A, 120B move radially in unison with the shaft 10. Therefore, the sensors 120A, 120B, are substantially fixed relative to the shaft and the target elements attached thereto, by virtue of the sensors 120A, 120B being rigidly attached to the frame 50, which is rigidly fixed to the outer race 64 of the bearing 60, and which is positionally fixed, at least in the radial direction (e.g., in the plane perpendicular to centerline CL), relative to the shaft 10. The frame 50 may experience vibrations that may result in some perturbation in relative position between the target elements and the sensor (s) 120A, 120B, however this flexing movement of the frame 50, independent of the shaft 10 and/or the target elements, is within the meaning of the terms "positionally fixed" and "in unison" as used herein, just as are any tolerances in the bearing 60 that allows for relative movement between the inner race 62 and the outer race 64.

Still referring to the example embodiment shown in FIG. 2, the frame 50 and/or the bearing 60 are attached by a compliant mount, generally designated 2, to a structural element 1 of the machine (e.g., aircraft, motor vehicle, stationary machine, ship, and the like) in and/or on which the shaft 10 is arranged and/or attached. The compliant mount 2 is configured to have spring and/or damping characteristics and can be made of any suitable material, or combination of materials, that will allow for relative movements between the structural element 1 and the mobile components including, for example, the frame 50, the bearing 60, the shaft 10, and other components associated therewith, which are capable of movement in the radial and/or axial direction of the shaft 10 relative to the structural element 1. In some embodiments, the compliant mount 2 can comprise an elastomeric material, such as natural rubber.

The system 100 also includes at least one temperature sensor 140A, 140B. The temperature sensor(s) 140A, 140B can be used to detect a temperature at, within, and/or around the system 100, and/or the components thereof. Detecting the temperature is advantageous because, by knowing the temperature, this parameter to can be used to determine the mechanical parameters that are temperature-dependent in calculating the torque being transmitted through the shaft 10 based on the torsional deformation of the shaft 10 over the target region TR. For example, the shaft may be more ductile at elevated temperatures and undergo additional torsional deformation for a same torque than would occur for the same torque at a lower operating temperature. The temperature sensor(s) 140A, 140B shown in FIG. 2 can be included in any of the various types of torque sensing systems disclosed herein without deviating from the scope of the disclosed subject matter. The temperature sensor(s) 140A, 140B can be attached to the frame 50, such that the shaft 10 and the temperature sensor(s) 140A, 140B move in the radial direction of the shaft 10 in unison, or the temperature sensor(s) 140A, 140B can be mounted independent from the shaft 10, such that the shaft 10 moves radially relative to the temperature sensor(s) 140A, 140B, meaning that a distance between the temperature sensor(s) 140A, 140B and the shaft 10 can change as the shaft 10 moves during normal operation. As such, in any of the example embodiments disclosed herein, one or more (e.g., a plurality of) temperature sensors 140A, 140B may be included therein or omitted therefrom.

The sensors 120A, 120B and the temperature sensors 140A, 140B each output a signal corresponding, respectively, to the circumferential distance between adjacent target elements, which corresponds to a torsional deformation of the shaft 10, and the to the temperature detected in the immediate vicinity of the components of the system 100 (e.g., the shaft 10). The signal from each of the sensors 120A, 120B and the temperature sensors 140A, 140B is transmitted to a signal conditioning unit 210 (SCU), sometimes referred to as a signal conditioner. One or more (e.g., a plurality of, or redundant pair of) SCUs 210 can be provided. In the embodiment shown, the first sensor 120A and the first temperature sensor 140A send their respective signals to a first SCU 210 and the second sensor 120B and the second temperature sensor 140B send their respective signals to a second SCU 210 to provide for redundant, fail-safe torque sensing capabilities.

Figure 3:
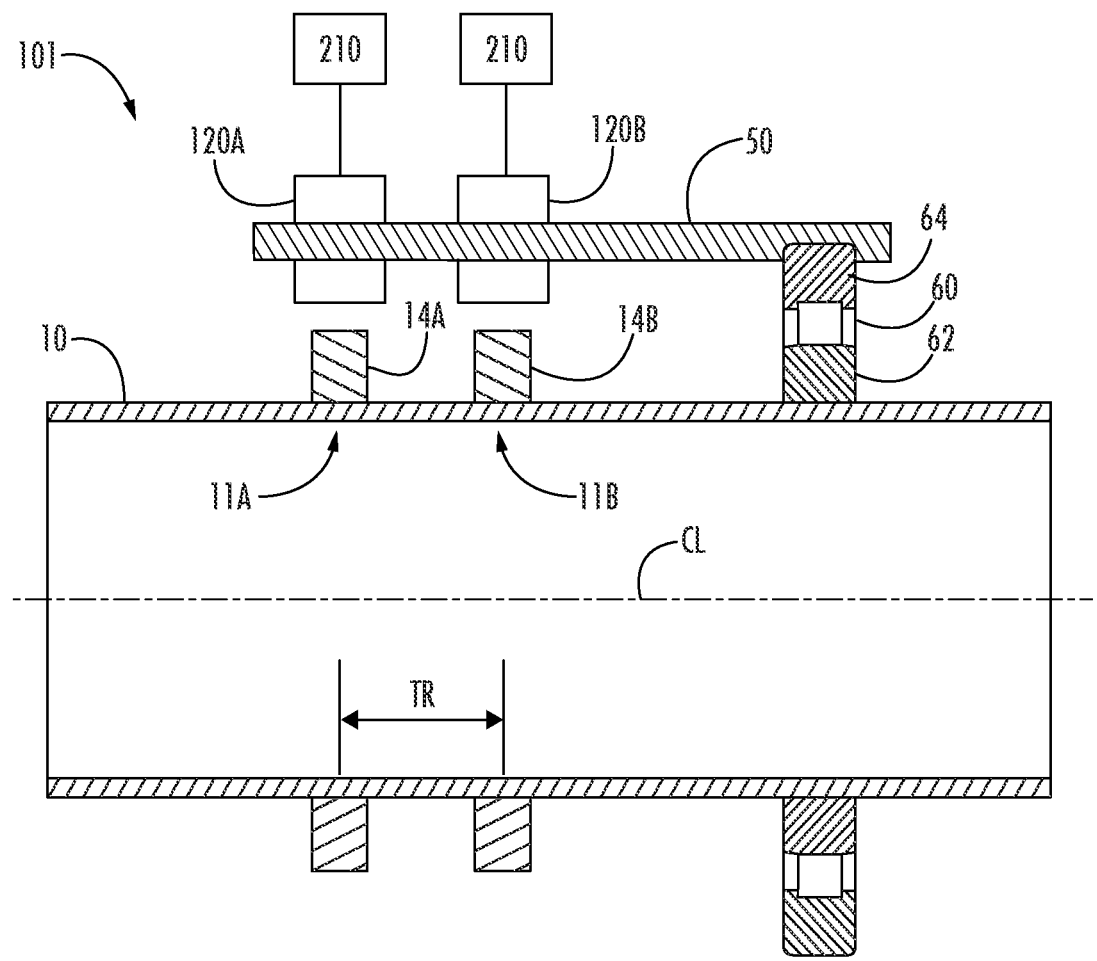
FIG. 3 is a cross-sectional view of an example embodiment of a system for sensing torque transmitted through a rotatable shaft via a multiplane torque sensor architecture rigidly attached to a bearing that supports the shaft.

FIG. 3 shows a different example embodiment of a torque sensing system, generally designated 101, for sensing (e.g., measuring and/or detecting) torque transmitted through a shaft 10. Shaft 10 is substantially similar to the shaft 10 shown and described relative to FIG. 2, however, unlike in system 100, in which the target elements 12A, 12B were respective interleaved target elements attached at respective first and second positions along the length of the shaft 10, in the example embodiment shown in FIG. 3, the system 101 has a first target element 14A, or set (e.g., a plurality) thereof, attached at the first position 11A and a second target element 14B, or set (e.g., a plurality) thereof, attached at the second position 11B. The first position 11A is axially offset (e.g., in the axial direction of the shaft 10), from the second position 11B. The distance between the first and second positions 11A, 11B defines the target region TR, which is the axial portion of the shaft along which the torsional deformation is measured.

In system 101, the first and second target elements 14A, 14B are not interleaved with each other. The system 101 comprises a plurality of (e.g., two) sensors 120A, 120B, which are, for example, variable reluctance (VR) sensors that are rigidly attached to a frame 50 and spaced out along the frame such that a first sensor 120A is positioned substantially over (e.g., axially aligned with) the first position 11A and a second sensor 120B is positioned substantially over (e.g., axially aligned with) the second position 11B. The first sensor 120A is used to detect a passage of each first target element 14A passing adjacent to the first sensor 120A as the shaft 10 rotates relative to the first sensor 120A and the frame 50 to which it is rigidly attached. The second sensor 120B is used to detect a passage of each second target element 14B passing adjacent to the second sensor 120B as the shaft 10 rotates relative to the second sensor 120B and the frame 50 to which it is rigidly attached. As such, upon the shaft 10 receiving and/or transmitting a torque therethrough, the shaft 10 is torsionally deformed (e.g., will twist). As the shaft 10 is twisted, the relative radial positions of the first target elements 14A relative to the second target elements 14B will change as the shaft is deformed, or twisted. It is this relative radial offset of the radial positions of the first and second target elements 14A, 14B that is detected, using the first and second sensors 120A, 120B, which are used to observe the phase shift relative to the output of the first and second sensors 120A, 120B when the shaft 10 is undeformed.

As shown, the first and second sensors 120A, 120B are rigidly attached to a frame 50, which is radially supported by a bearing 60. The bearing 60 and the frame 50 are substantially similar to that described in the system 100 of FIG. 2. It is advantageous to use a bearing with small radial play to minimize radial motion of the first and second sensors 120A, 120B relative to the outer surface of the rotating shaft 10 and, consequently, the first and second target elements 14A, 14B affixed thereto. As such, the radial distance between the first target elements 14A and the first sensor 120A and the radial distance between the second target elements 14B and the second sensor 120B are substantially constant (e.g., allowing for changes due to vibration of the frame 50 and tolerances of the bearing 60 allowing relative radial movement between the inner race 62 and the outer race 64). The first and second sensors 120A, 120B send signals corresponding to the detection of each of the respective first and second target elements 14A, 14B to a Signal Conditioning Unit (SCU) 210, which processes the timing measurements and calculates the torque being transmitted through the shaft 10 (e.g., substantially in real-time, allowing for the time necessary to perform mathematical calculations by a processor based on the signals sent from the first and second sensors 120A, 120B). As shown in FIG. 2, the system 101 may include one or more temperature sensors (140A, 140B, FIG. 2) to compensate for any changes in stiffness (e.g., torsional stiffness) of the shaft 10 as a function of temperature.

Figure 4:
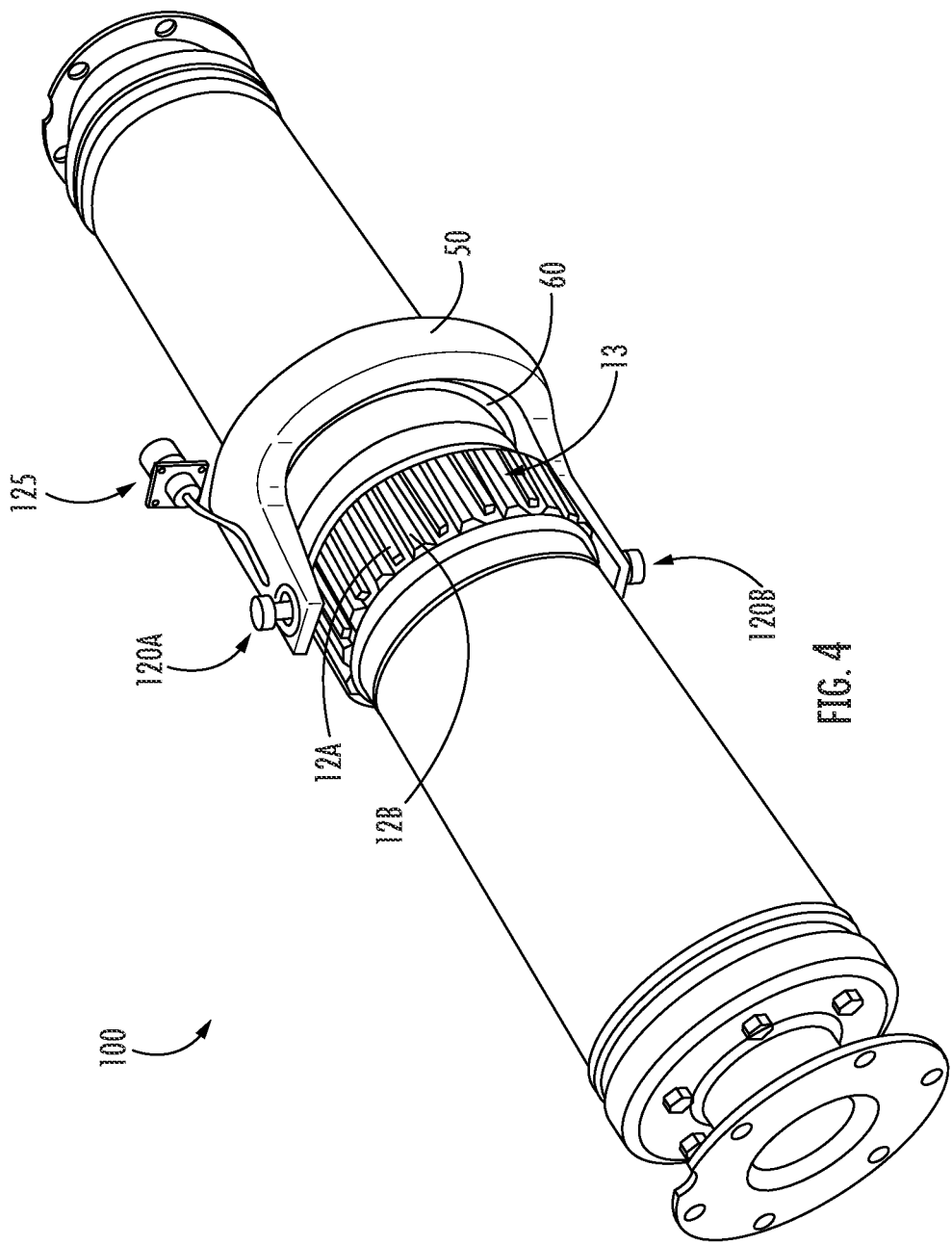
FIG. 4 is an isometric view of an example system for sensing torque transmitted through a rotatable shaft via at least one sensor positioned in a radially fixed position relative to the shaft, such that the gap in the radial direction between the shaft and the sensor is substantially constant.

The systems 100, 101 shown in FIGS. 2 and 3 generate electrical signals (e.g., from the first and second sensors 120A, 120B) that are then received by an SCU 210. The SCU 210 calculates a real-time measurement of the torque on the shaft 10 and can transmit an analog and/or digital signal to a Full Authority Digital Engine Controller (FADEC), Flight Control Computer (FCC), or other critical control system 250. An isometric view of the torque sensing system 100 is shown in FIG. 4. FIG. 4 shows that the system 100 has a connector, generally designated 125, for transmitting waveform signals from the first and/or second sensors 120A, 120B to an electronics box (e.g., containing an SCU 210) for processing (e.g., calculating torque through the shaft 10). As shown, the first and second sensors 120A, 120B are mounted to a frame 50 (as shown, in an example sensor support cradle) mounted, via a radial bearing 60, to the shaft 10 to prevent the frame 50 from rotating with the shaft 10. In the example embodiment shown in FIG. 4, the first and second target elements 12A, 12B are interleaved teeth to allow a single sensor 120A, 120B to measure twist, or torsional deformation, through this section of the shaft 10, which can be correlated by a temperature corrected torsional stiffness to torque.

Figure 5:
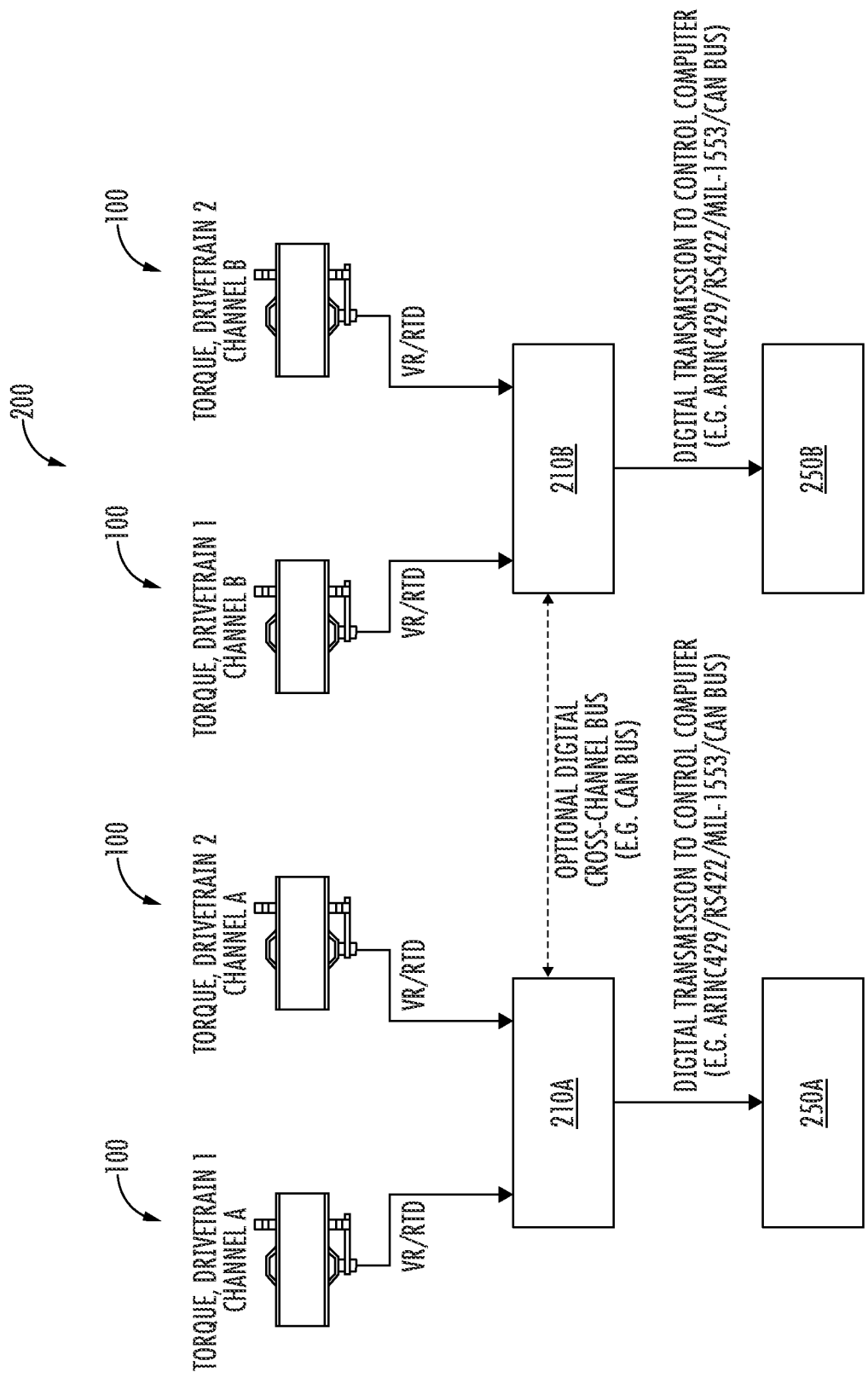
FIG. 5 is a schematic illustration of an example embodiment for a redundant communications architecture having a safety critical, redundant measurement of torque on two separate drivetrains, each of which has a system for redundant torque sensing of the respective shaft associated therewith.

A system architecture, generally designated 200, compatible with typical aerospace safety standards that comprises a plurality of torque sensing systems 100 is shown in FIG. 5. This system architecture 200 is fully redundant so as to prevent single point failures. As such, this system architecture 200 has four independent torque sensing systems 100 attached at four different locations along the length of the shaft 10 to provide in-line torque measurement. Two of the systems 100 are measuring the same torque value for redundancy. Each torque measurement channel has one or more sensors (e.g., 120A, 120B, FIGS. 2 and 3) that can determine the amount of torsional deformation of the shaft 10. These systems 100 are connected to two independent SCUs 210A, 210B to provide redundancy and process the tachometer outputs received from each system 100. Each SCU 210 can condition, for example, the output signals from up to seven (7) sensors and multiple temperature sensors, which can be, in some embodiments, a resistance temperature detector (RTD). Because of this, only two signal conditioning units have to be used (instead of the typical 4) in the example system architecture 200 disclosed herein. The RTD's are used to aid in estimating the shaft temperature stiffness and also account for thermal variations in the sensor mounting. The SCUs 210 are, in some embodiments, capable of communicating with each other for cross checking. Ultimately, redundant digital signals are transmitted to a corresponding critical control computer 250A, 250B (e.g. Flight Control Computer—FCC or Full Authority Digital Engine Controller—FADEC).

Figure 6:
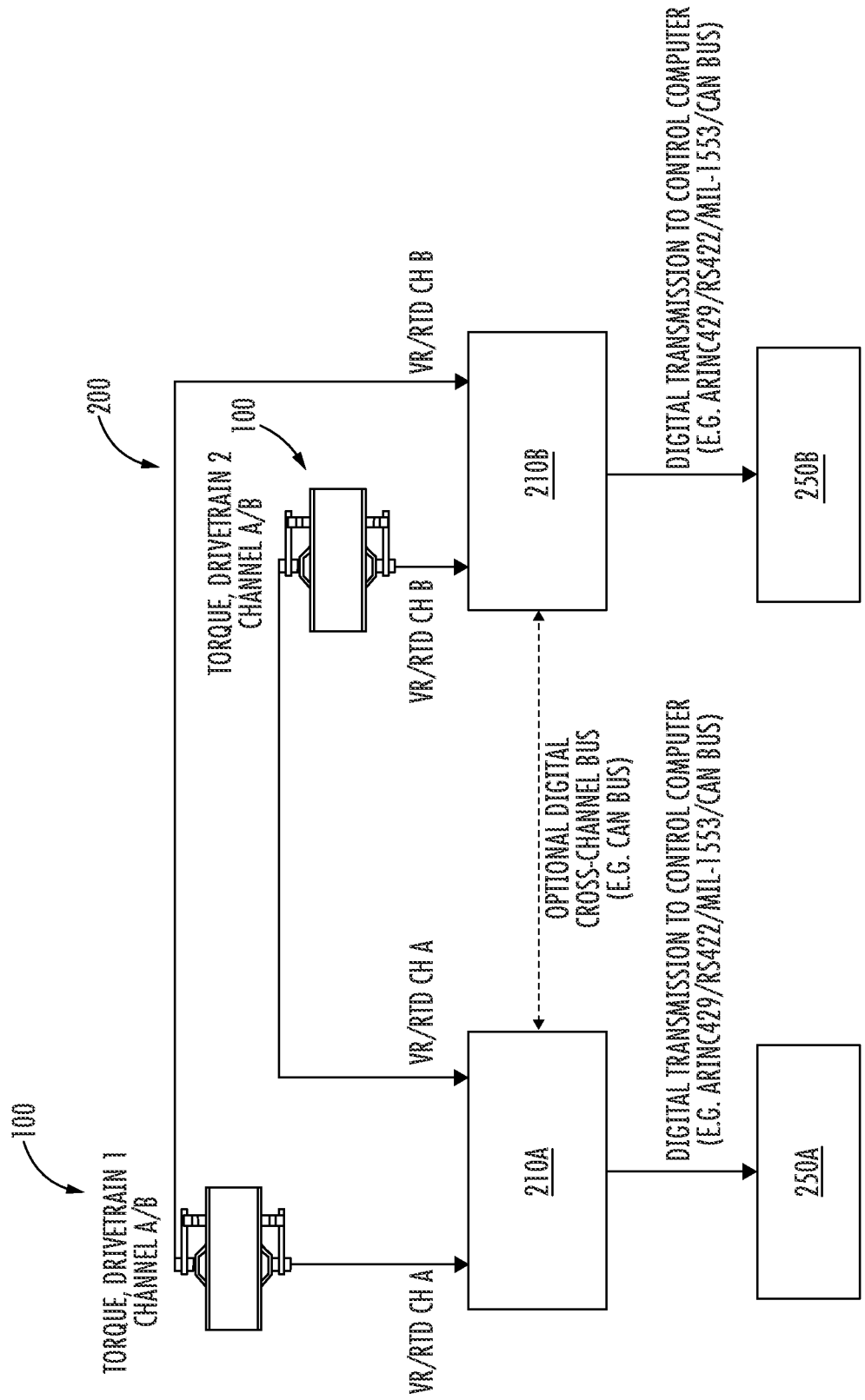
FIG. 6 is a schematic illustration of another example embodiment for a redundant communications architecture having a safety critical, redundant measurement of torque on two separate drivetrains, each of which has a system for redundant torque sensing of the respective shaft associated therewith.
Figure 7:
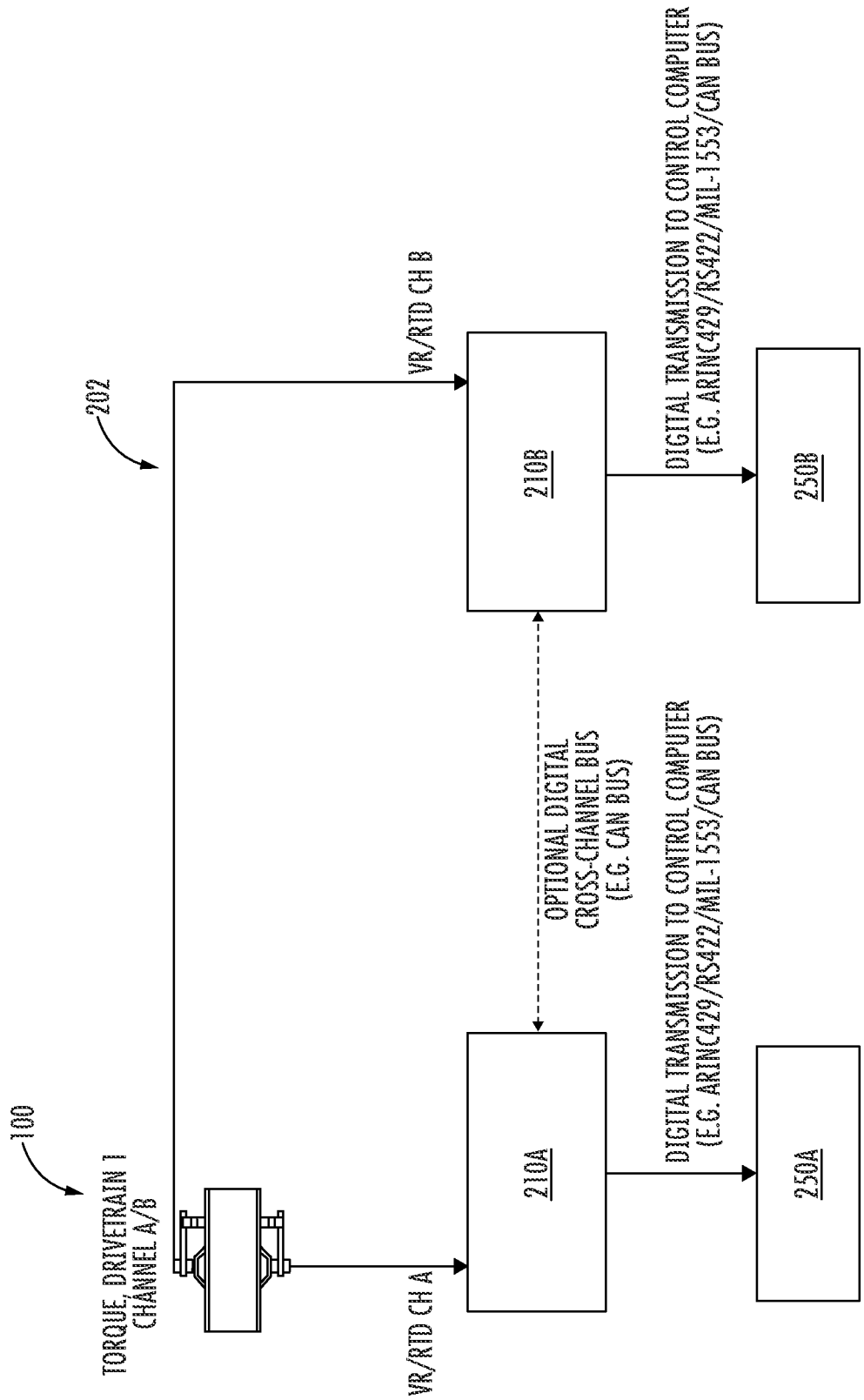
FIG. 7 is a schematic illustration of another example embodiment for a redundant communications architecture having a safety critical, redundant measurement of torque on a single drivetrain, which has a system for redundant torque sensing of the shaft thereof.

In FIG. 6, an alternate embodiment of the system architecture 200 is shown, in which two in-line portions of the drivetrain have torsional loads applied to them. As such, both portions of the drivetrain twist by an amount that the system 100 is measuring. This twist is observed by two independent sets of one or more sensors (e.g., 120A, 120B, FIG. 2), which provide the resulting electrical signals to the SCU 210. As was shown in FIG. 5, each SCU 210 may communicate with each other for redundancy, and ultimately send a digital signal to a corresponding critical control computer 250A, 250B. This system architecture 200 minimizes the mechanical hardware that needs to be integrated into a drivetrain. A further example embodiment of a system architecture, generally designated 202, is shown in FIG. 7. The system architecture 202 is generally similar to the system architecture 200, but includes using only a single system 100 to output a signal corresponding to torsional deformation of the shaft 10 at a single axial position of the shaft 10. The output of each sensor is transmitted to an independent SCU 210, which can communicate with the other SCU 210 in some embodiments, and is then transmitted to a corresponding critical control computer 250A, 250B for redundancy in signal processing.

Additional embodiments of such system architectures can also be implemented by those skilled in the art but are not shown herein for brevity. For example, four SCUs 210 could be used and, furthermore, could be integrated directly into a corresponding one of the critical control computers 250A, 250B to advantageously save space.

Figure 8:
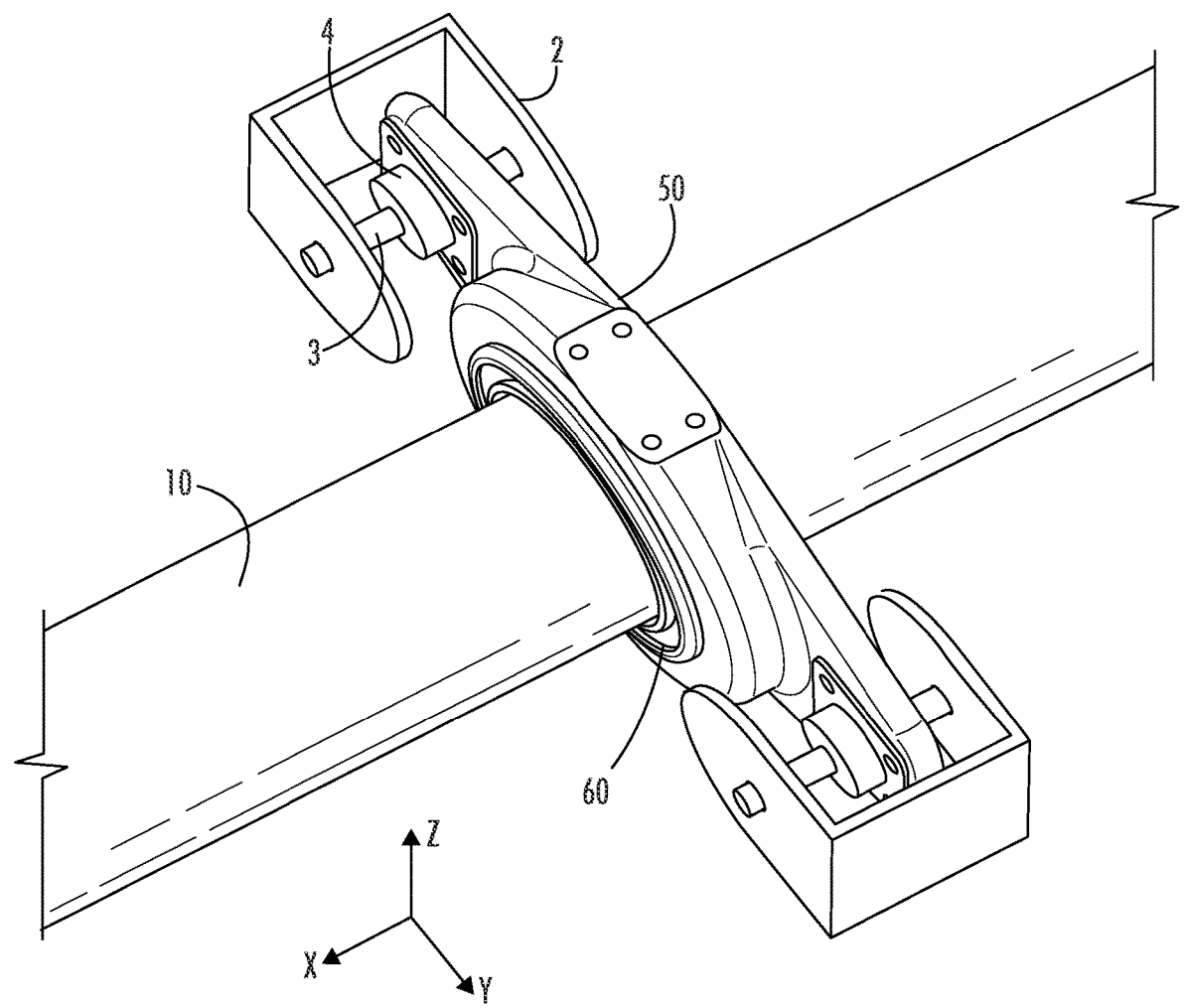

Relative motion between the drivetrain and the support structure (e.g., aircraft fuselage, or frame element) to which it is compliantly attached is accommodated by a series of hanger bearings (e.g., including frame 50 and bearing 60) positioned at the ends of each of the sync shafts (see generally FIG. 1). The bearing 60 is typically a precision ball bearing that suspends the shaft 10 and is housed in a frame 50 (e.g., a bracket) that is attached to the support structure 1 through a set of compliant (e.g., vibration isolation) mounts 2. This allows the bearing 60 and frame 50 to translate in axial direction (e.g., x-direction) and in the radial direction (e.g., y- and z-directions) with the shaft, as shown in FIG. 8. The compliant mount 2 has a support rod 3, along which the frame 50, along with the bearing 60 and sensor(s) can move in the x-direction as the shaft 10 moves in the x-direction (e.g., in the axial direction of the shaft 10). The compliant mount 2 also has a compliant grommet 4, by which the frame 50 is attached to the support rod 3, the compliant grommet 4 being made of any suitable material that will allow for compression of the compliant grommet 4 so that the frame 50, along with the bearing 60 and sensor(s), can move in the radial directions (e.g., the y- and/or z-directions) relative to the support rod 3 as the shaft 10 moves in the radial direction. The compliant mount 2 is rigidly attached to the support structure (e.g., 1, see FIG. 1). In some embodiments, sensor cradles may be mounted to the support structure to detect relative motion between the target elements and sensors equal to the relative motion allowed by the compliant mount(s) 2. Sensors rigidly attached to the frame 50 can move with the shaft 10, such that relative motion between the sensors and the targets will be predominated by the motion allowed by the precision ball bearing (e.g., 60).

Figure 9A:
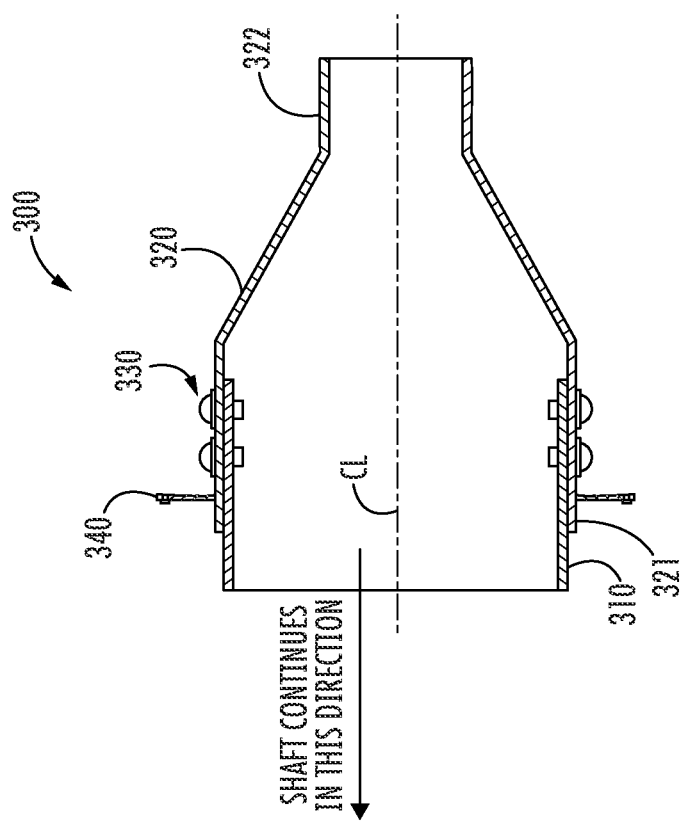
FIG. 9A is a cross-sectional view of a conventional spline shaft adapter.
Figure 9B:
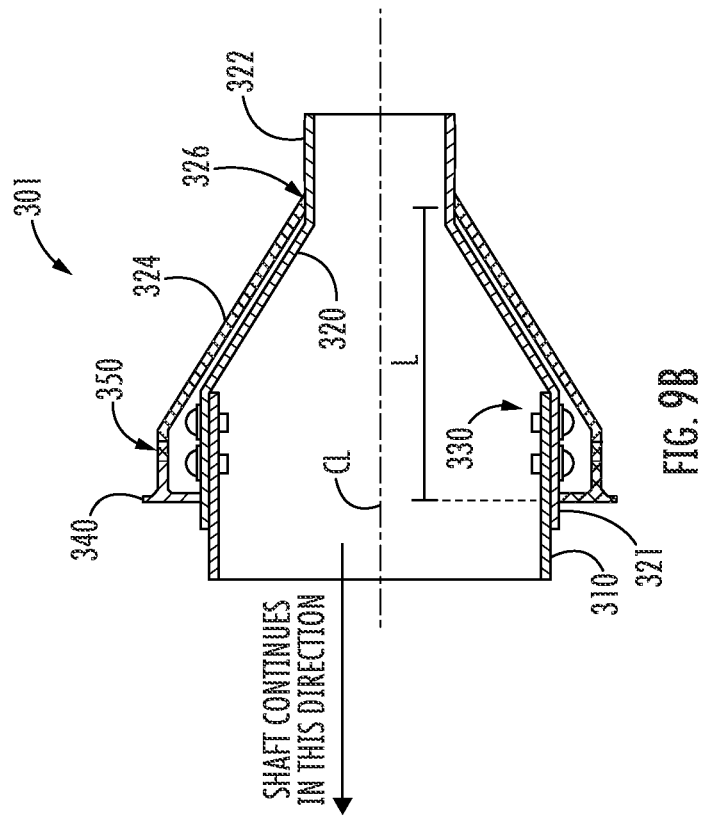
FIG. 9B is a cross-sectional view of an example embodiment of a spline shaft adapter having interleaved target elements to allow for torque sensing through and/or across the spline shaft adapter.

An example embodiment of a torque sensing device is shown in FIG. 9B, in which the target elements are integrated into a standard aerospace spline shaft adapter. FIG. 9A is an aerospace spline shaft adapter, generally designated 300, known from the prior art and is provided for reference to show the difference between it and the example torque sensing device, generally designated 301, shown in FIG. 9B. As shown in FIG. 9A, the adapter 300 comprises a male spline adapter 322 to transmit torque, an adapter coupling 320 that is generally conical, or at least frustoconical, in shape, and a mating coupling 321, which is attached by fasteners, generally designated 330, to a shaft 310. The mating coupling 321 has a balance flange 340 radially attached (e.g., integrally) thereabout. In FIG. 9B, the adapter 301 has a reference shaft structure 324 that is arranged external to (e.g., concentrically about, in a nested configuration) the adapter coupling 320. As such, the reference shaft structure 324 generally is conical, or at least frustoconical, and is oriented parallel to the tapered section the adapter coupling 320. The target elements are positioned near the balance flange 340 (e.g., away from the hanger bearing). The target elements are attached to the reference shaft structure 324 and the balance flange 340 and extend circumferentially about the adapter 301 in an alternating manner. As such, every other target element is attached to the balance flange 340 and the others of the target elements are attached to the reference shaft structure 324, such that each target element attached to the balance flange 340 is adjacent a target element attached to the reference shaft structure 324 on both sides of the target element attached to the balance flange 340. Upon torsional deformation of the adapter 301, the target elements of the reference shaft 324 move towards or away from the adjacent target elements attached to the balance flange 340 (e.g., in the circumferential direction, such that a gap between adjacent target elements changes as the adapter 301 undergoes torsional deformation, or twisting).

Figure 10:
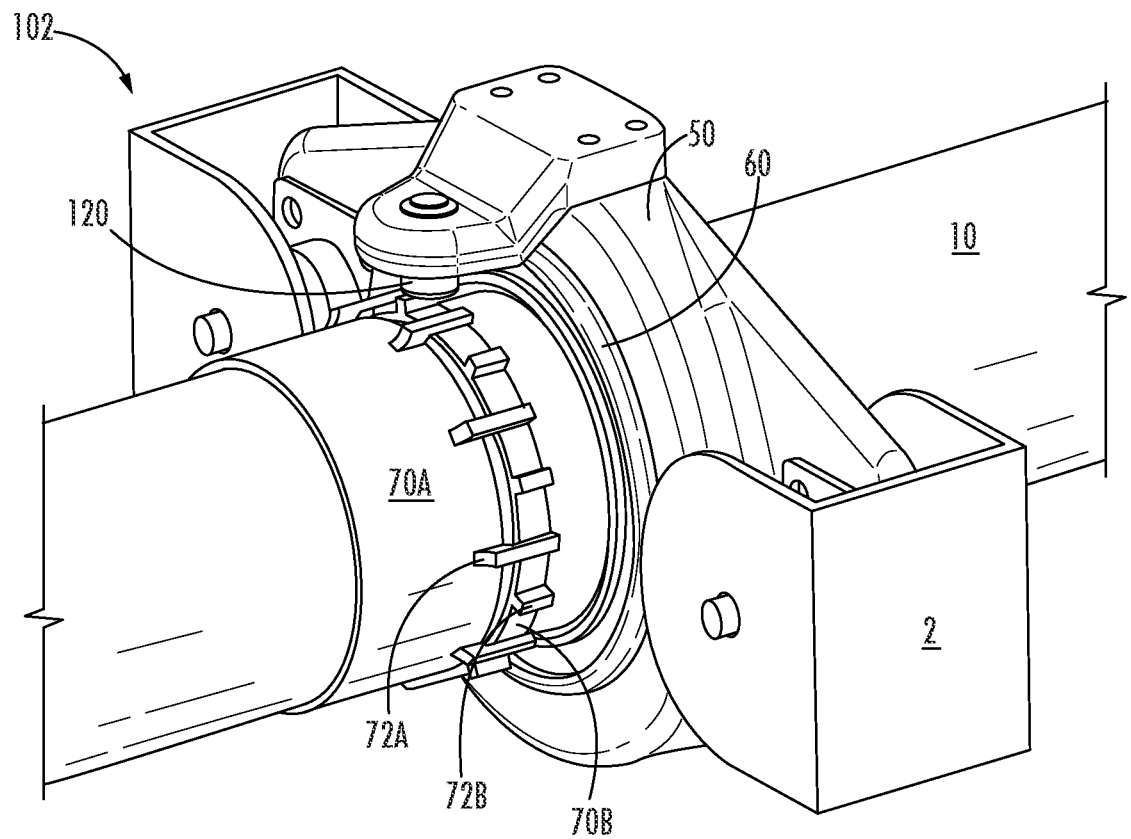
FIG. 10 is an isometric view of an example embodiment of a shaft having a set of interleaved monopole target elements (e.g., "teeth") supported by a compliantly-mounted bearing mounted, via a bearing frame, to a fixed structure, the system having a sensor mounted on the bearing frame for torque sensing.

FIG. 10 shows an isometric view of a system 102 similar to the target arrangement of FIG. 9B, with a modified hanger bearing frame 50 that has a VR sensor 120 rigidly attached thereto. In the example embodiment shown, the system 102 comprises a first plurality of target elements 72A attached about a first annular ring 70A and a second plurality of target elements 72B attached about a second annular ring 70B. Each of the first plurality of target elements 72A is attached to the first annular ring 70A and extends towards the second annular ring 70B, such that at least a portion of each target elements of the first plurality of target elements 72A extends over at least a portion of the second annular ring 70B. As such, the first and second pluralities of target elements 72A, 72B are arranged at least partially in a single plane, such that a single sensor 120 can detect changes in circumferential gaps between adjacent first and second target elements 72A, 72B. The first and second annular rings 70A, 70B are rigidly attached to the shaft 10 so that relative movement between the first annular ring 70A and the shaft 10 and/or between the second annular ring 70B and the shaft 10 is prevented. The first and second annular rings 70A, 70B are attached to the shaft 10 so as to be spaced apart from each other in the axial direction. The gap between the first and second annular rings 70A, 70B defines the target region, which is the portion of the shaft 10 over which the torsional deformation is to be detected by monitoring relative changes in the gaps between adjacent first and second target elements 72A, 72B.

Figure 11:
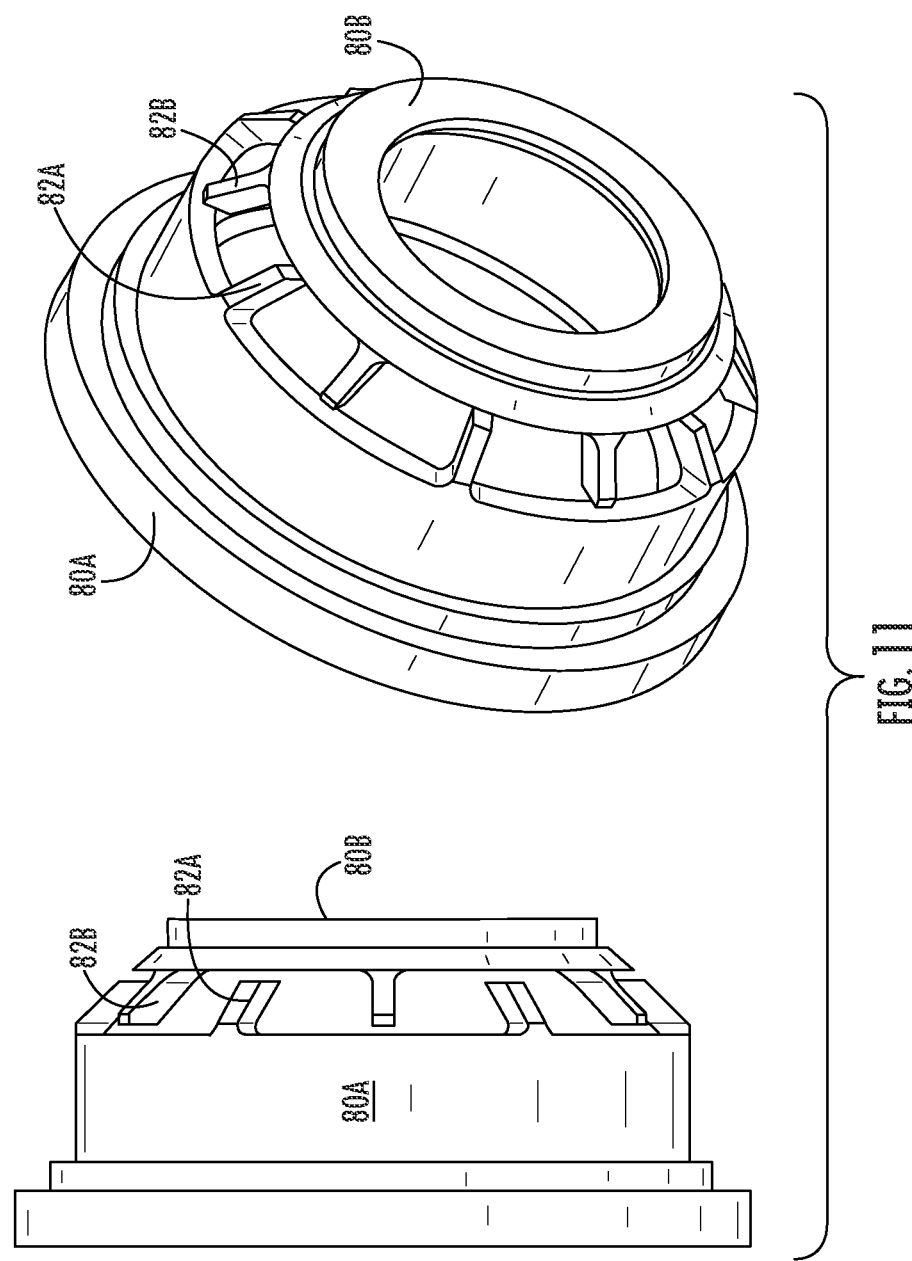
FIG. 11 shows side and isometric views of an example embodiment of a conical section of a sleeve configured for mounting to a shaft adapter and having a set of interleaved monopole targets attached (e.g., integrally) thereto.

FIG. 11 illustrates another example embodiment for a torque sensing device, in which the target elements 82A, 82B are shown being positioned closer to the hanger bearing (e.g., adjacent to the male spline 80B for transmitting torque). Such an arrangement as shown in FIG. 11 would necessarily require the sensors (e.g., 120) to be positioned closer to the hanger bearing, making the frame (e.g., 50) able to be a smaller and/or lighter component. In this example embodiment, the respective target elements 82A, 82B are positioned at a conical section of portions of a sleeve 80A, 80B that could be mounted to a shaft adapter like the adapter depicted in FIG. 9A, thereby allowing the device of FIG. 11 to be retrofit onto an existing prior art shaft adapter without requiring replacement thereof.

Figure 12:
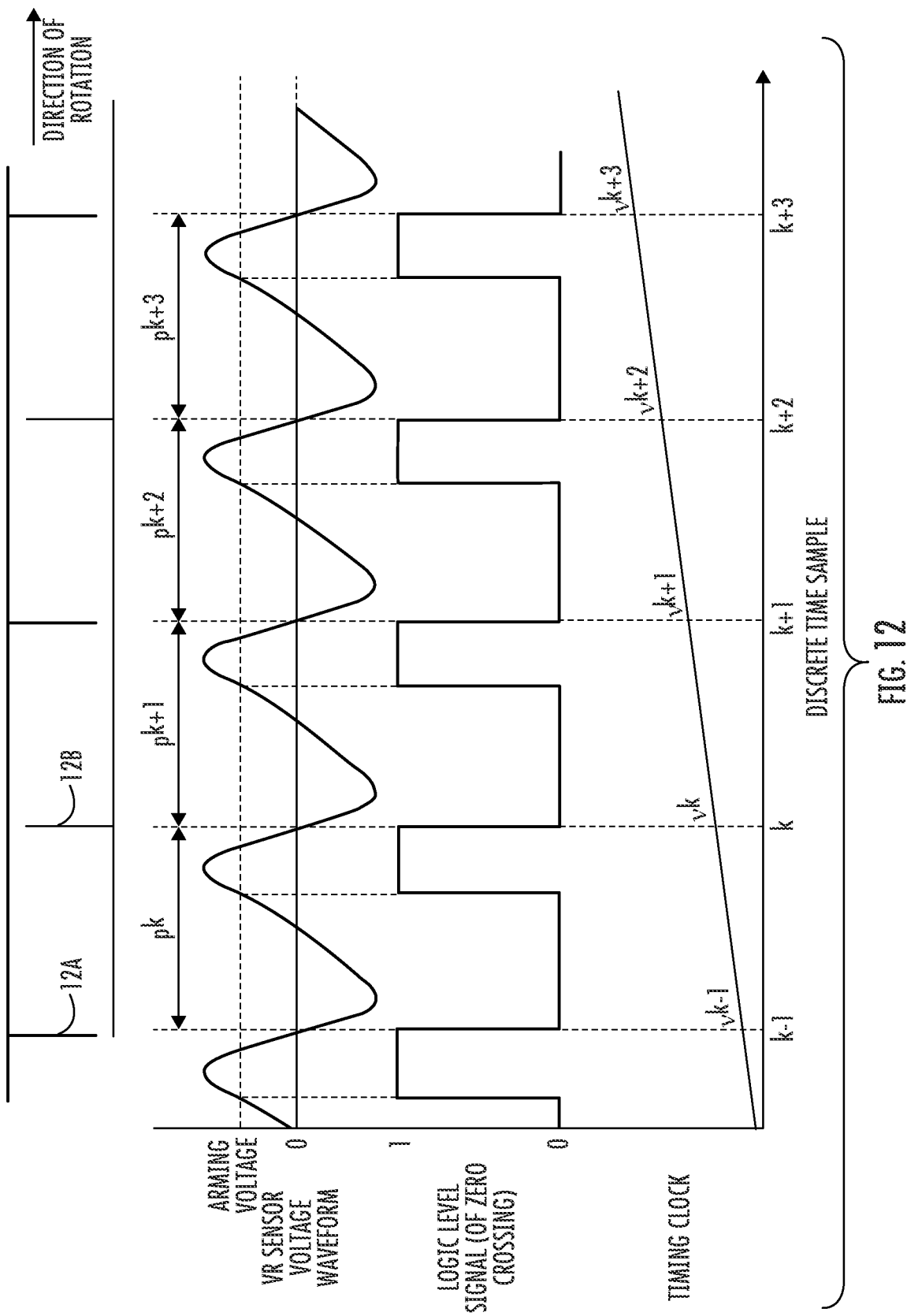
FIG. 12 is a graphical representation for conditioning the signal of a variable reluctance (VR) sensor, showing a voltage waveform with arming voltage threshold, a zero-crossing logic level signal with tooth period $p^k$, and a timing clock to capture zero-crossing logic signals.

In order to process the VR signals, the electrical waveforms are converted to a logic level signal using a zero-crossing detection circuit (or ZCD), as shown in FIG. 12. It is advantageous to minimize any signal noise, as it directly affects the accuracy of the twist measurement. These logic level signals are captured at a specific time $v^k$ and assigned to a value in the microcontroller's memory. The alternating target elements 12A and 12B are shown as an overlay corresponding to the electrical waveforms shown in FIG. 12.

Figure 13:
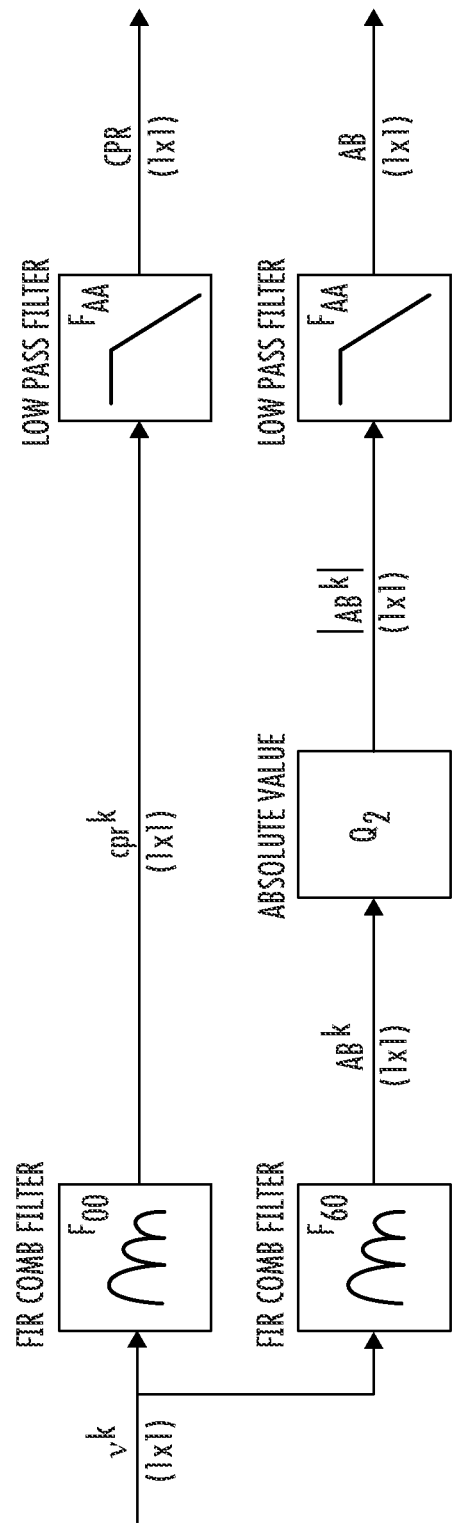
FIG. 13 is a filtering schematic for processing timing values from an example torque sensor.

Following the capture of the electrical waveforms (e.g., by a microcontroller), the timing can be filtered according to the diagram shown in FIG. 13. The example filtering schematic shown is specifically provided for a single sensor with N interleaved target elements measuring twist (e.g., torsional deformation), but similar processing can be implemented for multi-sensor embodiments and is known to those skilled in the art. There are two main paths for the filtering, the CPR (counts per revolution) path determines the shaft speed, and the AB path determines the twist between the left (or A) and right (or 8) side teeth (that are interleaved).

The speed can be calculated by applying a digital moving average filter $F_{00}$ to the timing measurement $v^k$ (e.g., where the sample rate of this filter is the target element passage frequency). This value can then be subsampled at a lower rate after the application of an Anti-Aliasing (or decimation) filter $F_{AA}$.

$$cpr^k = F_{00}v^k = \sum_{n=0}^{n=N-1} p^k z^{-n} = v^k - v^{k-N}$$

Where N is the number of target elements.

$$CPR = F_{AA} cpr^k$$

The resulting CPR value can be converted to shaft speed using the following equation.

$$f_{shaft} = \frac{f_{clock}}{CPR}$$

After the calculation of speed, the twist can be calculated by applying a digital moving average filter $F_{60}$ to the timing measurement $v^k$ (where the sample rate of this filter is the target element passage frequency) resulting in the $AB^k$ value.

$$AB^k = F_{60}v^k = \frac{(1-z^{-1})}{N} \sum_{n=0}^{n=N-1} (-1)^n z^{-n} v^k$$

The absolute value of $AB^k$ is then determined by applying the $Q_2$ operator, and the resulting value can be subsampled at a lower rate after the application of an Anti-Aliasing (or decimation) filter $F_{AA}$.

$$AB = F_{AA} Q_2 AB^k = F_{AA} |AB^k|$$

The value AB can be converted to twist θ (in degrees) with the following equation which uses the previously determine CPR value.

$$\theta = \frac{360}{CPR} AB$$

It is also helpful to then convert the twist θ to torque T.

$$\tau = K(\theta - \theta_0)$$

Where K is the torsional stiffness of the shaft (usually in units of in-lbs/deg, ft-lbs/deg, or N-m/deg) between the interleaved target elements and $\theta_0$ is a twist offset that is applied based on calibration and can be a function of speed, temperature, operating conditions, or other waveform parameters. The value K for the torsional stiffness can be selected from a table based on a temperature reading from a temperature sensor of the system, the temperature sensor being positioned adjacent the shaft at the target region.

Figure 14:
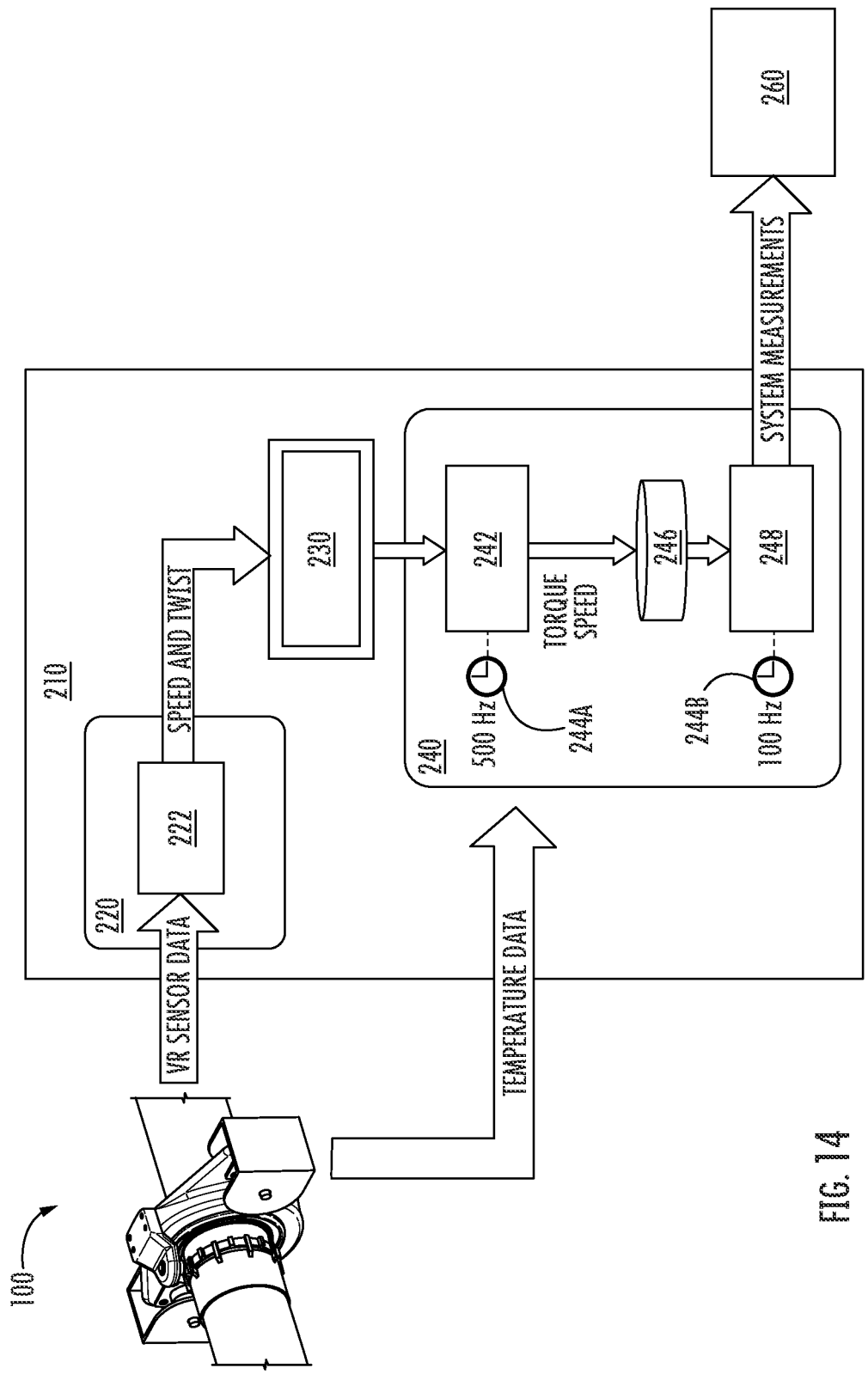
FIG. 14 is a schematic illustration of a processing architecture diagram for the torque sensing.

The processing architecture for the algorithms described above is divided in software to the task depicted in the schematic shown in FIG. 14.

Sensor signals from the system 100 are received in a second processor, FPGA, or the control law accelerator 220 (CLA) math accelerator within the SCU 210. The AB and CPR algorithms shown and described in FIG. 13 and described hereinabove are executed for each passage of a target element adjacent the sensor and the results are stored in shared random access memory (RAM) 230. At 500 Hz these sensor values are obtained by the CPU 240 in the tms_task 242 from the shared memory 230 (or the communications bus) between the CLA.

The tms_task 242 then applies an algorithm to normalize the data into engineering units, compensate the data for calibration parameters, and provide additional filtering for anti-aliasing before finally storing the output values of speed and torque to the datastore 246.

The comms_task 248 retrieves the data from the datastore 246 at the rate required (e.g., at 100 Hz) for transmission by the consumer 260 of the data. Additional rate limiting and filtering maybe applied prior to transmission over the preferred data bus, usually ARINC-429, RS422, or CAN.

If two channels of torque are being measured, the CLA 220 will independently process the AB and CPR calculations for the two channels at the target element passage frequency of both channels.

Figure 15:
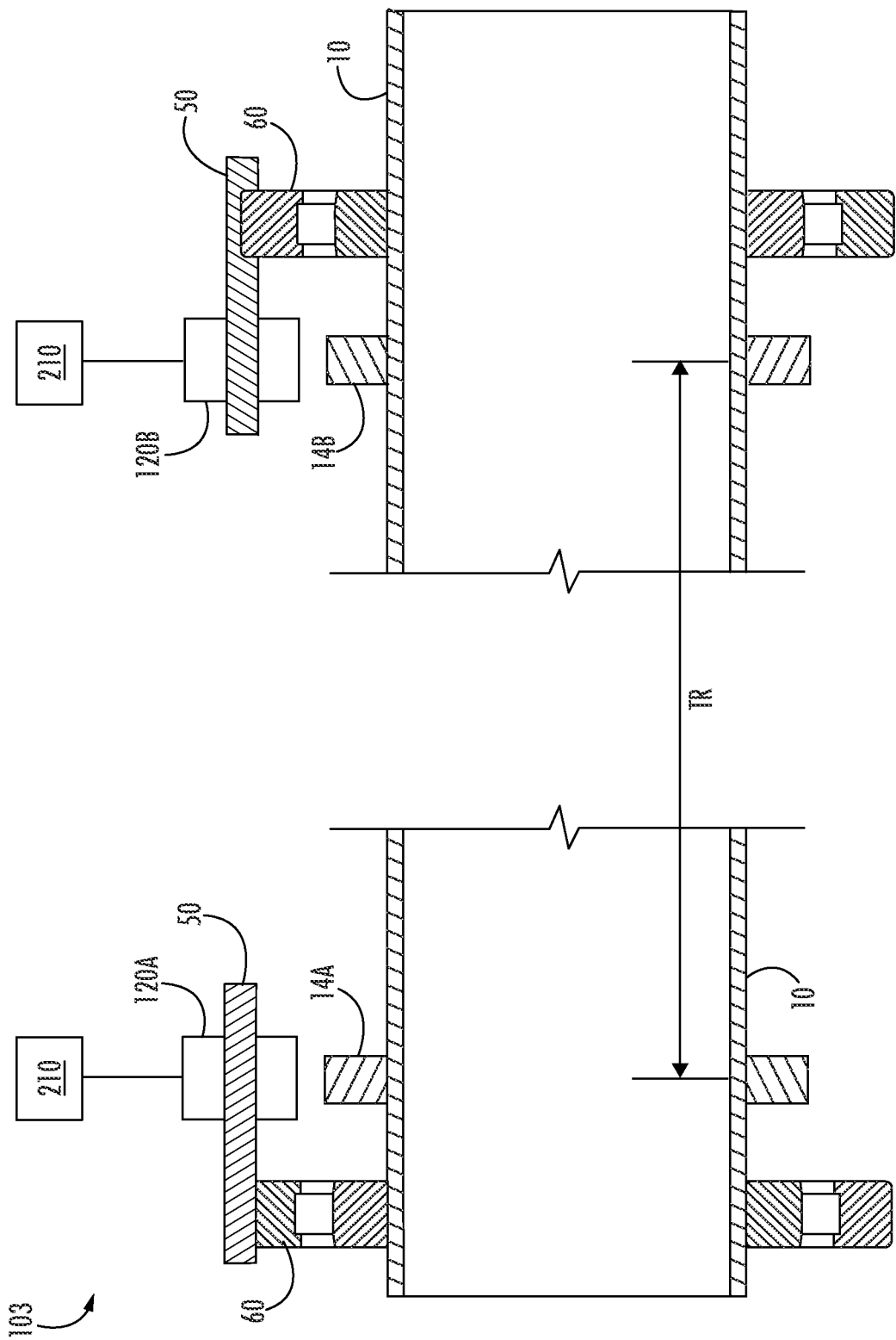
FIG. 15 is a cross-sectional view of an example embodiment of a system for sensing torque transmitted through a rotatable shaft, the system having two sensors attached on physically discrete bearings spaced apart along the length of the shaft to measure relative twist (e.g., torsional deflection) of the shaft across a long span of the shaft.

The scope of the subject matter disclosed herein is not limited to a hanger bearing mounted torque sensor with only one sensor at one shaft location. An alternative embodiment is shown in FIG. 15, in which VR sensors 120A, 120B are mounted on frames 50 respectively mounted to bearings 60 at each end of a long shaft 10, such that the sensors 120A, 120B are separated from each other by a large axial distance. As such, in the example embodiment shown in FIG. 15, the target region TR is at least a majority of a length of a shaft 10. Otherwise, the components of the system 103 of FIG. 15 are substantially similar to the components of the system 101 of FIG. 3 and the common elements thereof will not be described further herein in the interest of brevity. Each frame 50 may be connected (e.g., using a compliant mount 2) to the support structure 1 of the machine with which the shaft 10 is associated (e.g., installed in and/or attached to). Because the frames 50 are attached to the shaft 10 by a respective bearing 60, the radial distance between the first sensor 120A and the first target element(s) 14A is substantially constant and the radial distance between the second sensor 120B and the second target element(s) 14B is substantially constant. In some embodiments, the radial distance between the first sensor 120A and the first target element(s) 14A is substantially identical to the radial distance between the second sensor 120B and the second target element(s) 14B is substantially constant during operation of the system 103, even as the shaft 10 may be moving in the radial and/or axial directions relative to the support structure 1.

This longer target region TR, as measured axially along the shaft 10, will experience a much larger amount of twist than, for example, in system 100 of FIG. 2 and system 101 of FIG. 3 under an identical torsional load transmitted through the shaft 10. This increased magnitude of twist, or torsional deflection, is advantageous in some aspects, in that the sensors 120A, 120B can be operated with increased accuracy when the magnitude of the twist of the shaft is commensurately greater due to the increased length of the target region TR. However, other operational parameters and/or motions of the shaft 10 may cause significant errors if the overall twist measured was not so large. For example, large temperature gradients may be present across the axial length of the shaft 10. It may also be more difficult in such embodiments to align the two frames 50 to yield a consistent phase difference. Furthermore, various deflections of the frame 50 could occur that may erroneously manifest in the measurement as twist of the shaft 10.

Figure 16:
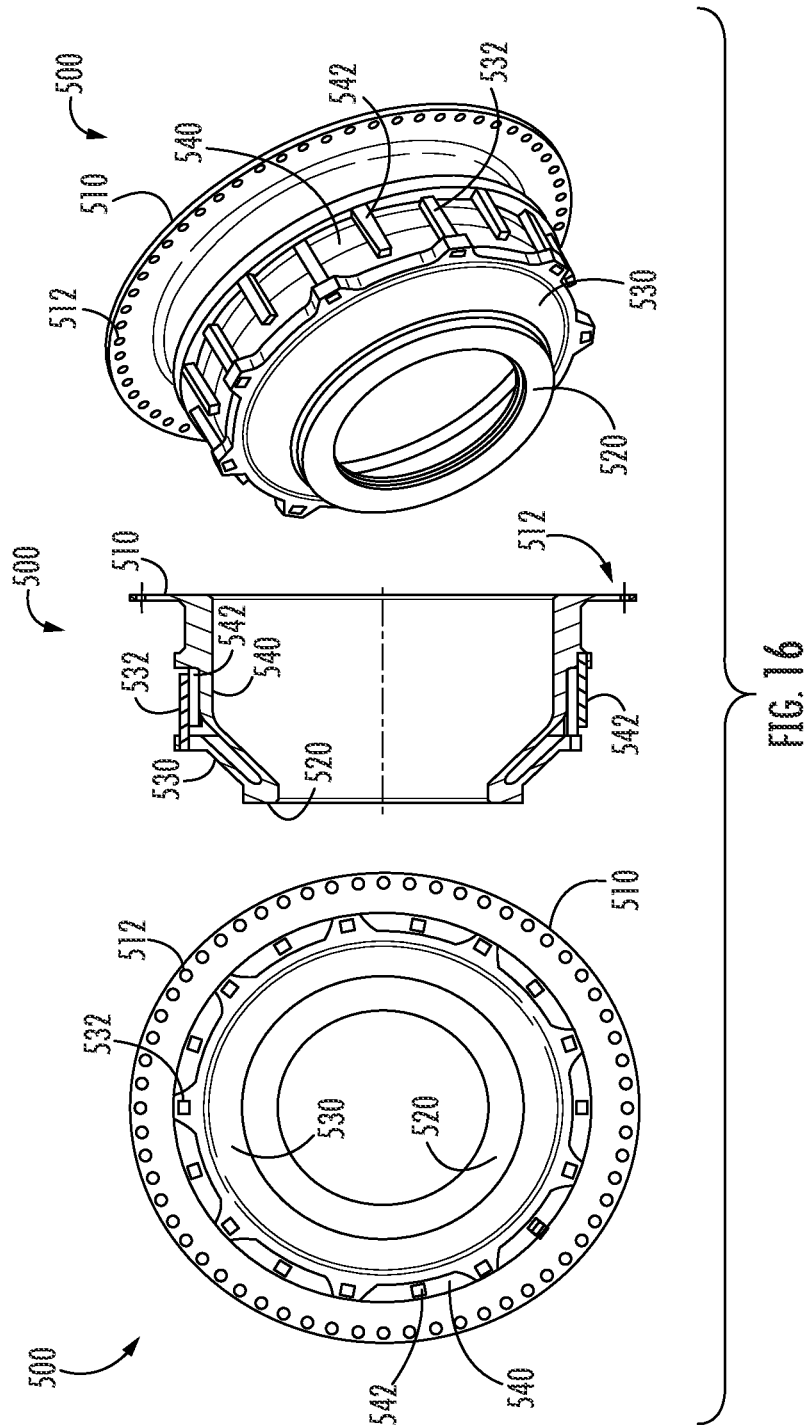
FIG. 16 shows various views of an example embodiment of an integrated wheel where rivets can be installed to store calibration information.

Sometimes it is advantageous to include in a torque sensing device, generally designated 500, system-specific calibration information, such as drivetrain stiffness or twist offset. The HBM torque sensor at a basic level acts as a torque sensor which requires a slope and offset calibration. This calibration may be different for each specific set of hardware (e.g., for each specific drivetrain), thus, it may be advantageous to provide calibration information as part of the torque sensing device 500 that can be read off the shaft without having to program such calibration information into a SCU 210 or by inserting a floppy disk, USB thumb drive, data card, or otherwise transmitting such information to the SCU 210. An example of how this would be implemented is shown in FIG. 16, which shows a torque sensing device 500, which has holes 512 formed circumferentially about an outer flange member 510. These holes 512 can be filled (e.g., by inserting a fastener, such as a rivet, therethrough) to store "bits" of information corresponding to an offset and a slope associated with the particular drivetrain component. A sensor (e.g., a VR sensor) could be provided and positioned proximate to the holes 512 to measure bits (e.g., which of the holes 512 is filled) and output a signal to the SCU 210, which can translate the "bits" into offset and slope calibration information. Verification that the measured data is valid could be performed with a checksum and repeated reads of the data as the shaft rotates.

Figure 17:
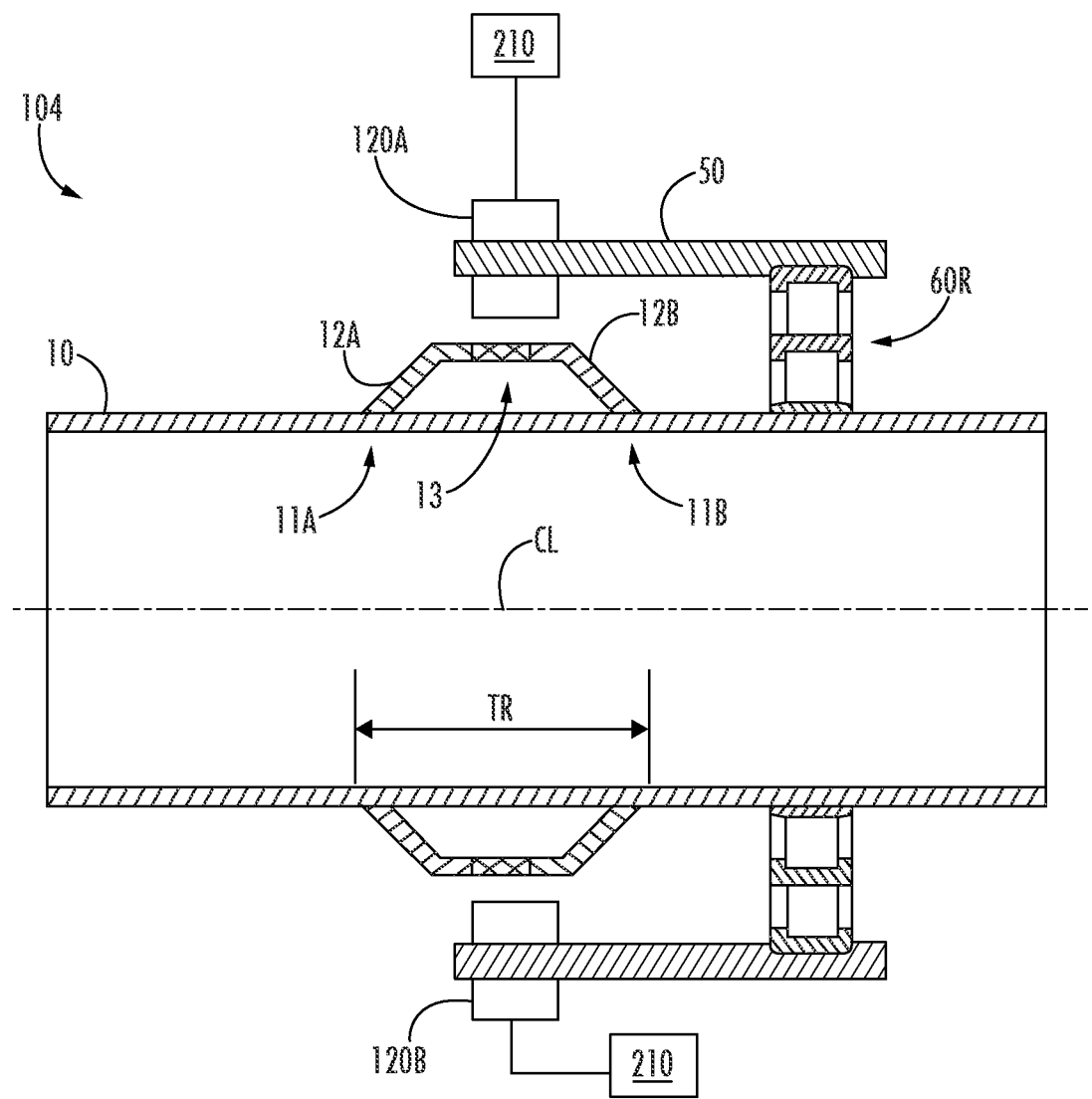
FIG. 17 is a cross-sectional view of an example embodiment of a system for sensing torque transmitted through a rotatable shaft, the shaft being supported by redundant bearings to allow the shaft to continue rotating upon failure of one of the bearings.

FIG. 17 is an example embodiment of a torque sensing system, generally designated 104, in which the components of the torque sensing system 104 are substantially identical to, and operate in a substantially similar manner as, the components of the torque sensing system 100 shown in FIG. 2. As such, similar components will not be addressed further herein in the interest of brevity. In system 104, however, the bearing 60R is a redundant bearing in which the shaft 10 remains capable of rotation, relative to the frame 50, even upon a failure of a portion of the bearing. The bearing 60R may be implemented in any of the example torque sensing systems disclosed herein without limitation.

Figure 18:
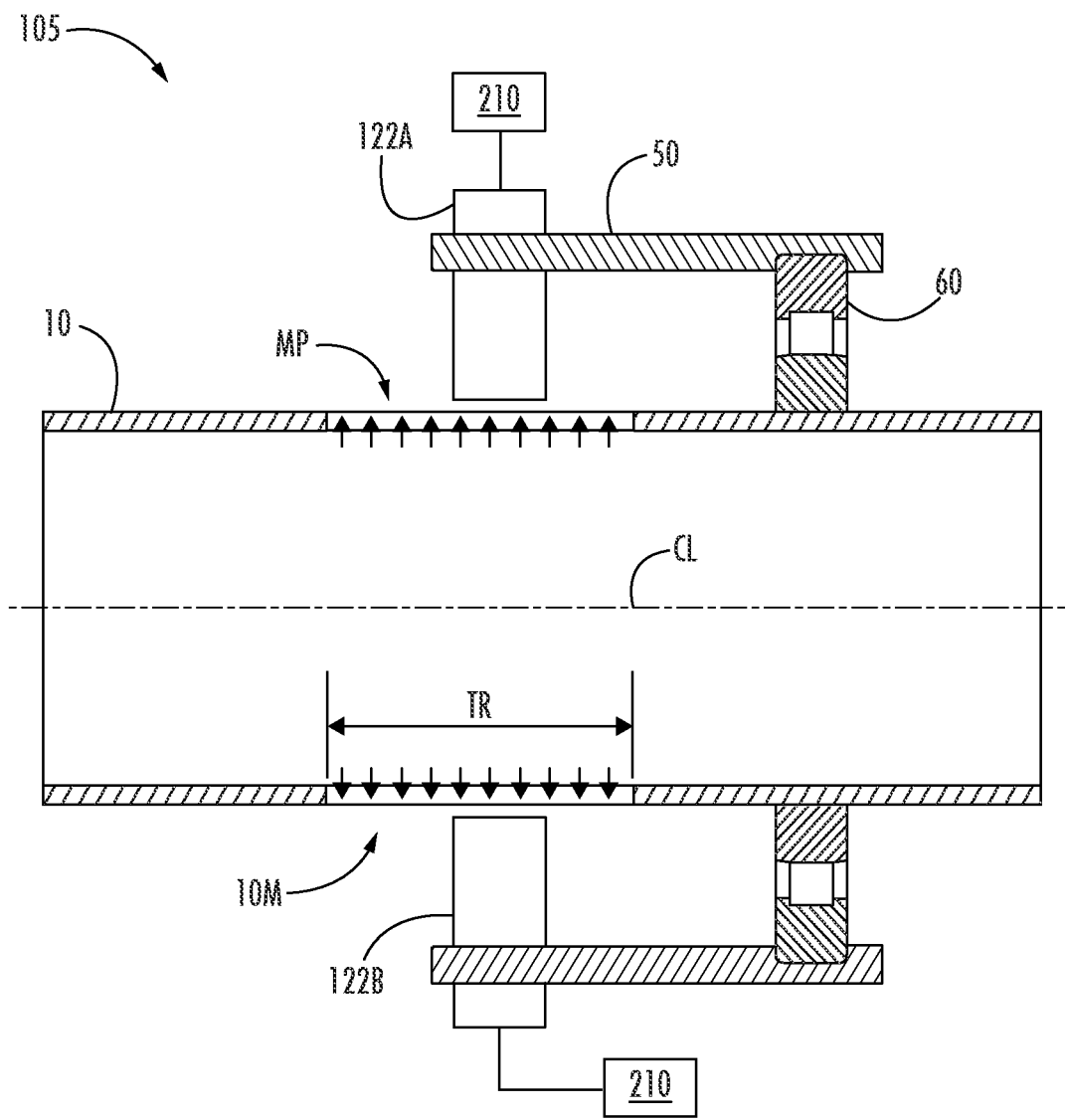
FIG. 18 is a cross-sectional view of an example embodiment of a system for sensing torque transmitted through a rotatable shaft via a sensor configured to detect a change in magnetization due to torsional deformation within a target region of the shaft.

FIG. 18 is an example embodiment of a torque sensing system, generally designated 105. Unlike in other torque sensing systems disclosed herein, in which variable reluctance (VR) sensors are used to detect the relative movements of a set of target elements, system 105 comprises at least one magnetic field sensor 122A. In the embodiment shown, the system 105 comprises a first magnetic field sensor 122A and a second magnetic field sensor 122B. The first and second magnetic field sensors 122A, 122B are rigidly attached, as was disclosed already in, for example, system 100, a frame and a bearing 60. In some embodiments, the magnetic field sensors 122A, 122B can be respective linear Hall sensors. The frame 50 is positionally fixed in the radial direction, relative to the shaft 10, such that the radial distance between the first and second magnetic field sensors 122A, 122B, respectively, and the shaft 10 remains substantially constant. As such, the first and second magnetic field sensors 122A, 122B and the shaft 10 move substantially in unison (e.g., allowing only relative movement therebetween caused by vibration of the frame 50 and/or tolerances of the bearing 60) upon movement of the shaft 10 relative to a support structure 1 to which it is attached by a compliant mount 2 (see, e.g., FIG. 2). The shaft has a target region TR, over the surface of which a magnetic polarity MP is provided. When the shaft 10 is torsionally deformed (e.g., twisted, or experiences a shear force), the magnetic polarity MP changes. The magnetic field sensor(s) 122A, 122B detect any changes in the magnetic polarity MP over the target region TR. The change in magnetic polarity MP as a function of applied torque is known and the torque transmitted through the shaft 10 can be calculated therefrom in a substantially similar manner to other example embodiments described elsewhere herein.

Figure 19:
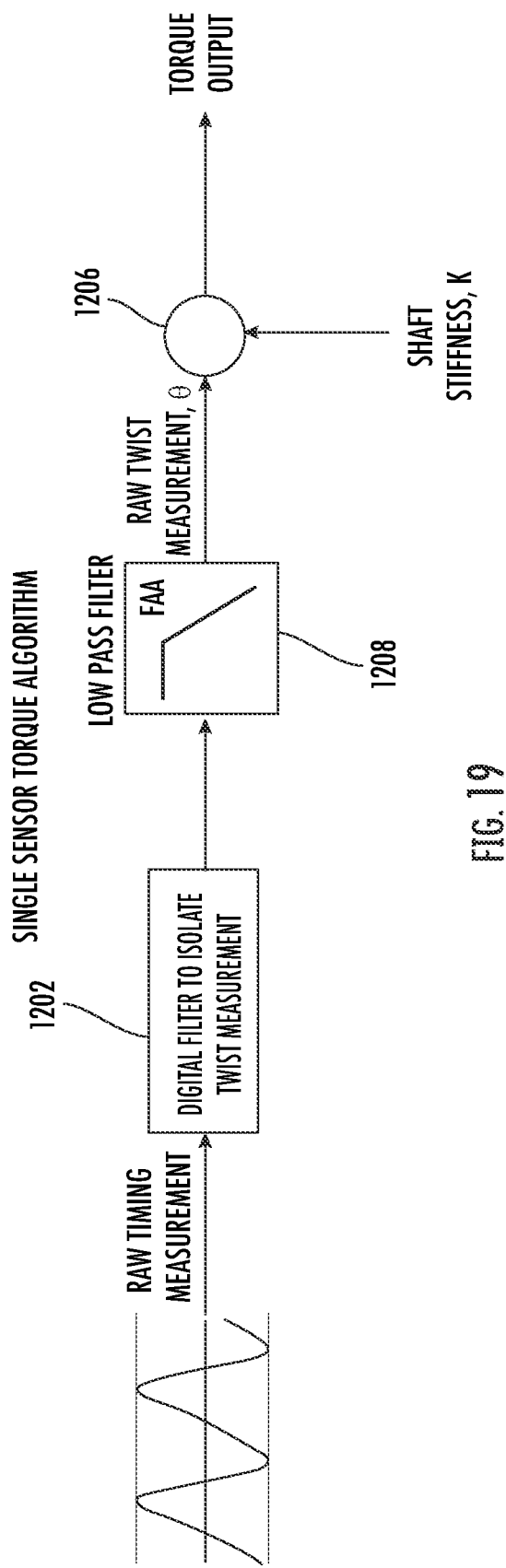
FIG. 19 is a signal processing diagram for a system configured to calculate the torque applied to a shaft.

FIG. 19 is a signal processing diagram for a system configured to calculate the torque applied to a shaft. The signal processing is configured for isolating the effect of twist on the timing pattern of the shaft. The signal processing includes a digital filter 1202 configured to isolate a twist measurement from a raw timing measurement. The signal processing includes a low pass filter 1204 configured to output a raw twist measurement. The signal processing includes a combiner 1206 to use a measurement of shaft stiffness with the twist measurement to produce a torque output.

Figure 20:
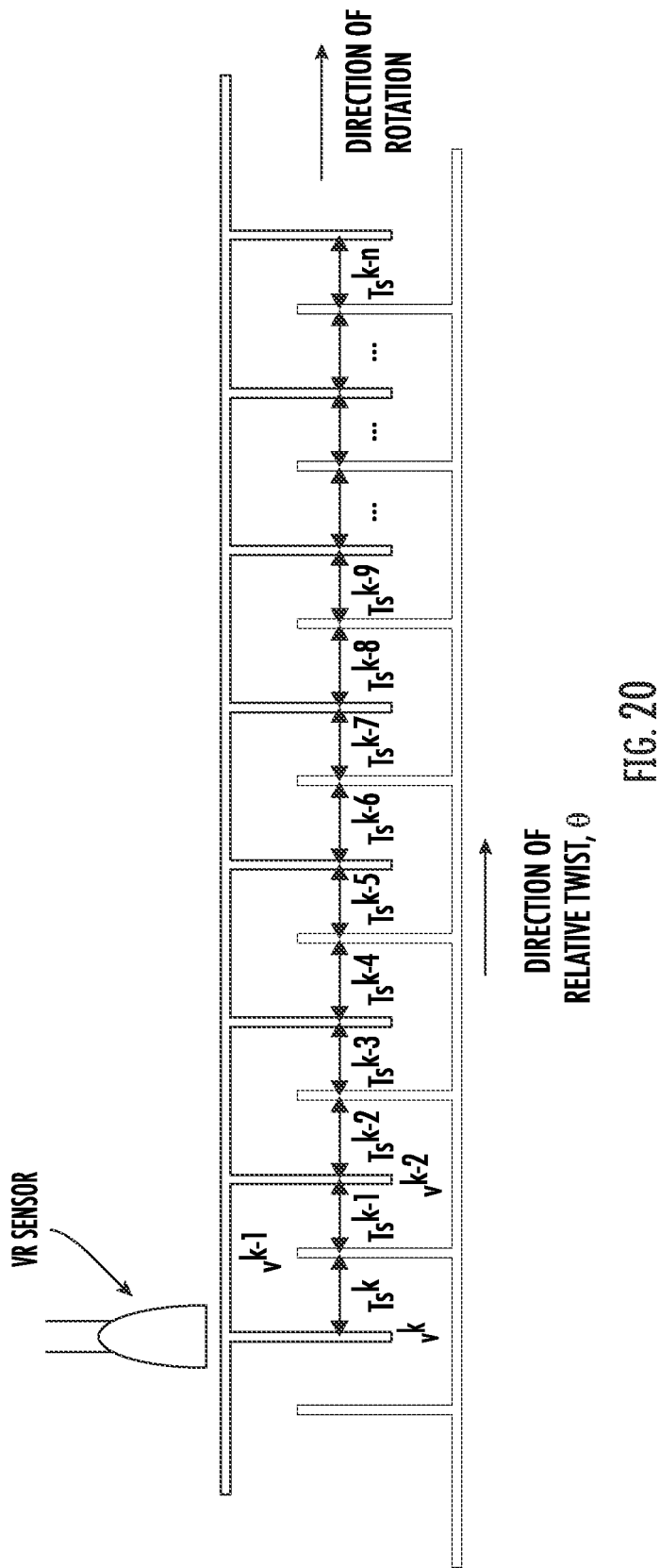
FIG. 20 is a diagram showing an unraveled set of targets passing a VR sensor.

FIG. 20 is a diagram showing an unraveled set of targets passing a VR sensor. The timing pattern between the teeth can be written as a series of timing values based on the period of time between two successive tooth passages (or zero crossings).

In the example shown in FIG. 20, the instant in time that each tooth passes ($v^k$) can be written as the following:

$$v^k = \begin{cases} \dfrac{f_{clock}}{N} \displaystyle\int_0^k \dfrac{dk'}{f_{shaft}^{k'}} + \dfrac{f_{clock}}{f_{shaft}^k} \dfrac{\theta}{2\pi} & \text{(where } k \text{ is odd)} \\ \dfrac{f_{clock}}{N} \displaystyle\int_0^k \dfrac{dk'}{f_{shaft}^{k'}} & \text{(where } k \text{ is even)} \end{cases}$$

Where $f_{clock}$ is the clock speed of the timing measurement, N is the total number of teeth, k is the discrete index in time, $f_{shaft}$ is the shaft speed at time instant k, and $\theta$ is the shaft twist. This can be further simplified if the shaft speed, $f_{shaft}$, is roughly constant.

$$v^k = \begin{cases} \dfrac{f_{clock}}{N} \dfrac{k}{f_{shaft}} + \dfrac{f_{clock}}{f_{shaft}} \dfrac{\theta}{2\pi} & \text{(where } k \text{ is odd)} \\ \dfrac{f_{clock}}{N} \dfrac{k}{f_{shaft}} & \text{(where } k \text{ is even)} \end{cases}$$

The timing value at each discrete index in time, $Ts^k$, can be written as the following (with shaft speed $f_{shaft}$ assumed to be constant over the small time interval between teeth):

$$Ts^k = v^k - v^{k-1} = \dfrac{f_{clock}}{f_{shaft}}\left(\dfrac{1}{N} + \dfrac{(-1)^k \theta}{2\pi}\right)$$

Note that the final result of this equation applies to all discrete indices of k. The effect of twist on an interleaved pattern of teeth results in a timing change that adds to one time period and subtracts from the next; this pattern repeats every revolution. A series of digital filtering can therefore isolate the twist. The twist over an entire revolution can be calculated by adding and subtracting all of the timing values.

$$\sum_{n=0}^{n=N-1} (-1)^n Ts^{k-n} =$$

$$Ts^k - Ts^{k-1} + Ts^{k-2} - Ts^{k-3} + \ldots + Ts^{k-N-2} - Ts^{k-N-1} = -\dfrac{f_{clock}}{f_{shaft}} \dfrac{\theta}{\pi} \dfrac{N}{2}$$

Rewriting this equation and solving for $\theta$ results in the following:

$$\theta^k = \dfrac{-2\pi}{N} \dfrac{f_{shaft}}{f_{clock}} \sum_{n=0}^{n=N-1} (-1)^n Ts^{k-n}$$

This can also be rewritten as a digital FIR filter with the following coefficients for a case where there are N=12 teeth. This digital FIR filter is an example of the digital filter 1202 for isolating twist.

$$B = \dfrac{-2\pi}{12} \dfrac{f_{shaft}}{f_{clock}} [1 \quad -1 \quad 1 \quad -1 \quad 1 \quad -1 \quad 1 \quad -1 \quad 1 \quad -1 \quad 1 \quad -1]$$

In practice, this value of $\theta$ should be designed to always be positive, and should also be filtered down to a lower bandwidth with an anti-aliasing filter, $F_{AA}$; it is also helpful to apply a calibration offset $\theta_0$ to adjust for any real world imperfections in the amount of twist.

$$\theta = F_{AA}|\theta^k| - \theta_0$$

After performing filtering operation, the shaft torsional stiffness, K, can be multiplied in to determine torque, T:

$$T = K(\theta - \theta_0)$$

Similarly, this signal processing can also be augmented to detect axial motion of the shaft. It uses the addition of a specific slant pattern in the teeth, and an additional digital filter used to isolate the effects of the slanted teeth.

Figure 21:
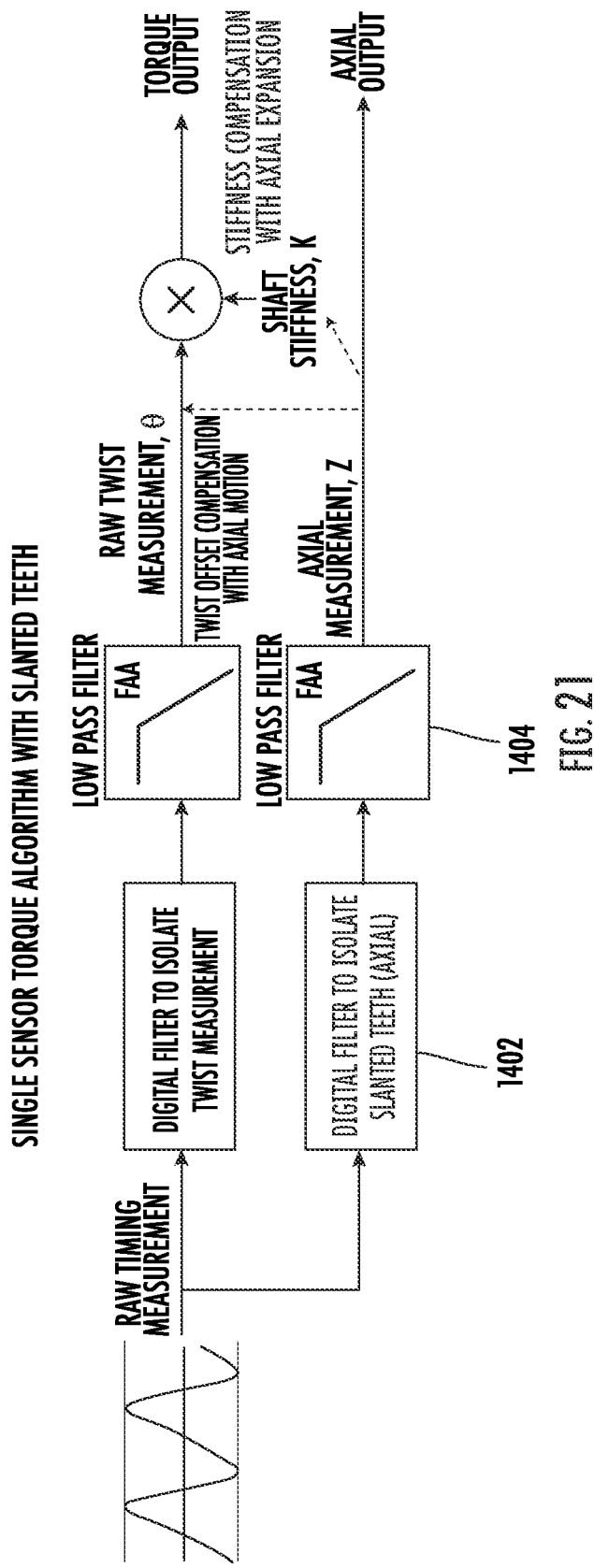
FIG. 21 is a signal processing diagram for a system augmented to detect axial motion.

FIG. 21 is a signal processing diagram for a system augmented to detect axial motion. The signal processing includes a parallel path includes a digital filter 1402 to isolate slanted teeth and a low pass filter 1404 to output an axial measurement. The axial measurement can be used for compensation of the twist measurement and the shaft stiffness to improve the torque output.

Figure 22:
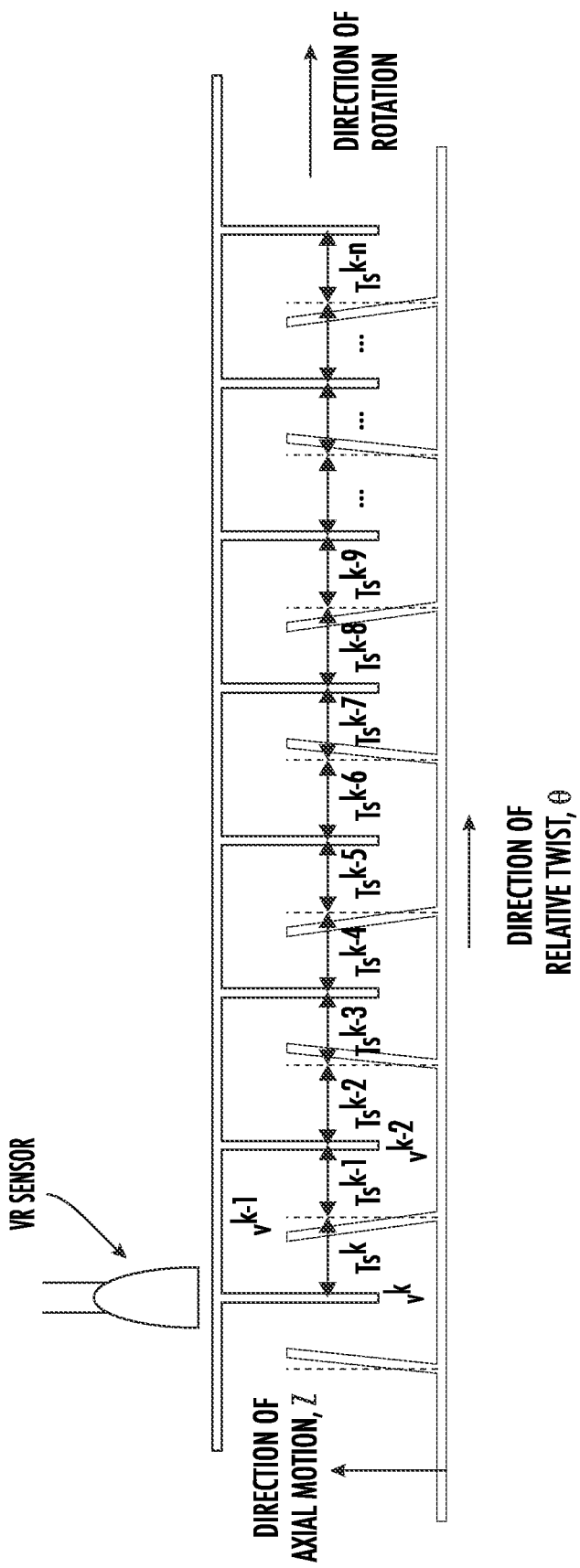
FIG. 22 is a diagram showing an unraveled set of targets (some of which are slanted) passing a VR sensor.

FIG. 22 is a diagram showing an unraveled set of targets passing a VR sensor. Similar to the case with straight teeth, described above with reference to FIG. 20, the timing at each tooth passage can be written in the following form with the addition of a term to account for the effect of the axial motion and the slants of the teeth:

$$v^k = \begin{cases} \frac{f_{clock}}{N} \int_0^k \frac{dk'}{f^k_{shaft}} + \frac{f_{clock}}{f_{shaft}} \frac{\theta}{2\pi} + \frac{f_{clock}}{f_{shaft}} \frac{z}{2\pi r} \tan(\beta \times (-1)^{(k-1)/2}) \\ \text{(where } k \text{ is odd)} \\ \frac{f_{clock}}{N} \int_0^k \frac{dk'}{f^k_{shaft}} \quad \text{(where } k \text{ is even)} \end{cases}$$

Where $f_{clock}$ is the clock speed of the timing measurement, N is the total number of teeth, k is the discrete index in time, and $f_{shaft}$ is the shaft speed at time instant k, and $\theta$ is the shaft twist. Additional parameters introduced to represent axial motion include z, the axial displacement, r the radius of the targets that are on the shaft, and $\beta$ which is the angle of the tooth slants. While it is possible to make these slants non-uniform, the signal processing complexity is reduced if the slant is equal and opposite in the pattern shown above and the slant is a small angle. This can be further simplified if the shaft speed, $f_{shaft}$, is roughly constant over the small time interval between teeth.

$$v^k = \begin{cases} \frac{f_{clock}}{N} \frac{k}{f_{shaft}} + \frac{f_{clock}}{f_{shaft}} \frac{\theta}{2\pi} + \frac{f_{clock}}{f_{shaft}} \frac{z}{2\pi r} \tan(\beta \times (-1)^{(k-1)/2}) \text{(where } k \text{ is odd)} \\ \frac{f_{clock}}{N} \frac{k}{f_{shaft}} \quad \text{(where } k \text{ is even)} \end{cases}$$

The timing value at each discrete index in time, $Ts^k$, can be written as the following (with shaft speed $f_{shaft}$ assumed to be constant) pattern that repeats where m is an integer (1, 2, 3, ... ).

$$Ts^{k-0} = Ts^{k-0-4m} = v^{k-0} - v^{k-1} = \frac{f_{clock}}{f_{shaft}}\left(\frac{1}{N} - \frac{\theta}{2\pi} + \frac{Z}{2\pi r}\tan\beta\right)$$

$$Ts^{k-1} = Ts^{k-1-4m} = v^{k-1} - v^{k-2} = \frac{f_{clock}}{f_{shaft}}\left(\frac{1}{N} + \frac{\theta}{2\pi} - \frac{Z}{2\pi r}\tan\beta\right)$$

$$Ts^{k-2} = Ts^{k-2-4m} = v^{k-2} - v^{k-3} = \frac{f_{clock}}{f_{shaft}}\left(\frac{1}{N} - \frac{\theta}{2\pi} - \frac{Z}{2\pi r}\tan\beta\right)$$

$$Ts^{k-3} = Ts^{k-3-4m} = v^{k-3} - v^{k-4} = \frac{f_{clock}}{f_{shaft}}\left(\frac{1}{N} + \frac{\theta}{2\pi} + \frac{Z}{2\pi r}\tan\beta\right)$$

Or more simply, $$Ts^k = \frac{f_{clock}}{f_{shaft}}\left(\frac{1}{N} - \frac{(-1)^k \theta}{2\pi} + \frac{(-1)^{k(k+1)/2} z}{2\pi r}\tan\beta\right)$$

Note that the calculation for twist remains the same, and axial motion does not affect nominally affect this measurement of twist:

$$\theta^k = \frac{-2\pi}{N} \frac{f_{shaft}}{f_{clock}} \sum_{n=0}^{n=N-1} (-1)^n Ts^{k-n}$$

$$\theta = F_{AA} |\theta_k| - \theta_0$$

$$T = K(\theta - \theta_0)$$

The axial displacement over an entire revolution can be calculated by adding and subtracting all of the timing values.

$$\sum_{m=0}^{m=N/4-1} Ts^{k-4m} - Ts^{k-1-4m} - Ts^{k-2-4m} + Ts^{k-3-4m}$$

$$= Ts^k - Ts^{k-1} - Ts^{k-2} + Ts^{k-3} + \ldots + Ts^{k-N-4} - Ts^{k-N-3}$$

$$- Ts^{k-N-2} + Ts^{k-N-1}$$

$$= N \frac{f_{clock}}{f_{shaft}} \frac{Z}{2\pi r} \tan\beta$$

Rewriting this equation and solving for z results in the following:

$$z^k = \frac{2\pi r}{N \tan(\beta)} \frac{f_{shaft}}{f_{clock}} \sum_{m=0}^{m=N/4-1} Ts^{k-4m} - Ts^{k-1-4m} - Ts^{k-2-4m} + Ts^{k-3-4m}$$

This can also be rewritten as a digital FIR filter with the following coefficients for a case where there are N=12 teeth. This digital FIR filter is an example of the digital filter 1404 for isolating axial motion.

$$B = \frac{2\pi R}{12\tan(\beta)} \frac{f_{shaft}}{f_{clock}} [1 \quad -1 \quad -1 \quad 1 \quad 1 \quad -1 \quad -1 \quad 1 \quad 1 \quad -1 \quad -1 \quad 1]$$

In practice, this value of z should be designed to always be positive, and should also be filtered down to a lower bandwidth with an anti-aliasing filter, $F_{AA}$; it is also helpful to apply a calibration offset $z_0$ to adjust for any real world imperfections in the axial location.

$$Z = F_{AA}|z^k| - z_0$$

Due to real-world machining tolerances, the twist value measured may change as the axial measurement changes. This would adjust the twist offset to be a function of the axial measurement (denoted $\theta_0\{z\}$).

$$T = K(\theta - \theta_0\{z\})$$

In addition, depending on the mechanical construction of the shaft, temperature variation may increase proportionally with the axial measurement. In order to remove a temperature sensor, the axial measurement can be used to adjust the stiffness as a function of the axial measurement, denoted K{z} (instead of being a function of temperature). This would adjust the Torque calculation as follows:

$$T = K\{z\}(\theta - \theta_0\{z\})$$

Similar to the single sensor torque calculation, a dual sensor configuration can be used to achieve additional accuracy. This involves placing one of the two sensors over opposite sets of the interleaved teeth, for example, as shown in FIG. 6.

Figure 23:
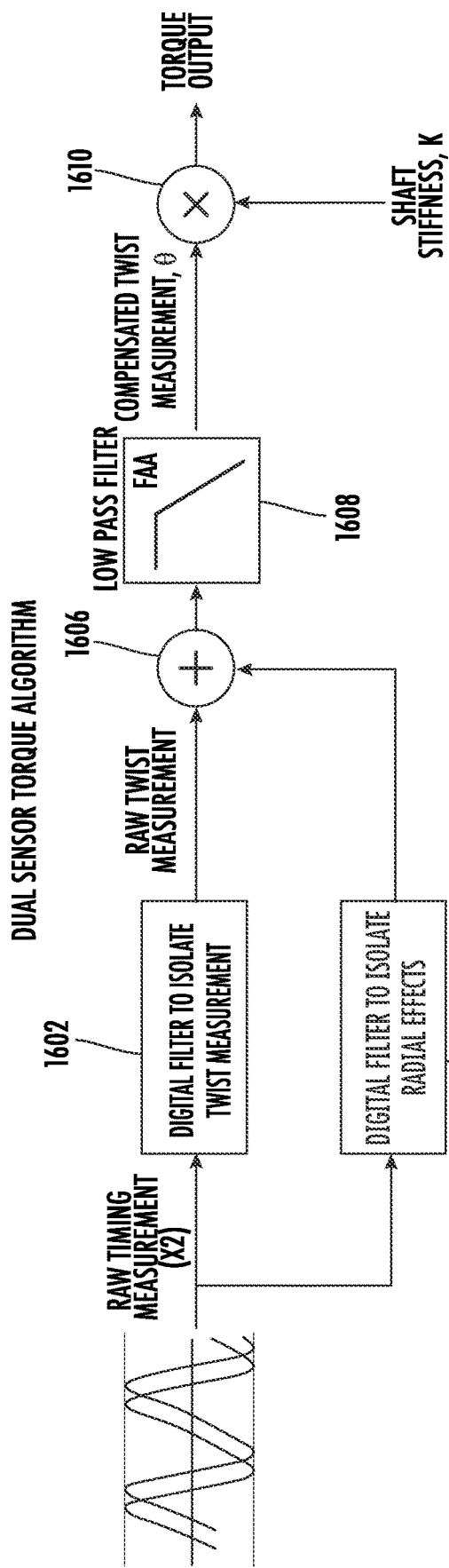
FIG. 23 is a signal processing diagram of a system configured for processing two sensor signals to achieve a more accurate torque measurement.

FIG. 23 is a signal processing diagram of a system configured for processing two sensor signals to achieve a more accurate torque measurement. The signal processing includes a digital filter 1602 to isolate a twist measurement from a raw timing measurement, a digital filter 1604 to isolate radial effects, and a combiner 1606. The output of the combiner 1606 is input to a low pass filter 1608 that outputs a compensated twist measurement. The signal processing includes another combiner 1610 to use a measurement of shaft stiffness to generate a torque output.

In general, these effects become more important as overall twist on the shaft becomes small, such as 0.5 degrees. At large gaps, e.g., >0.2" there is a noise improvement utilizing two sensors for measurement. Some magnetic effects from multiple sensors cause phase shifts in the twist measurement with radial motion. Multiple sensors can be used such that this effect (observed on the order of 0.030 degrees) to be reduced to negligible levels (e.g., 0.004 degrees).

Figure 24:
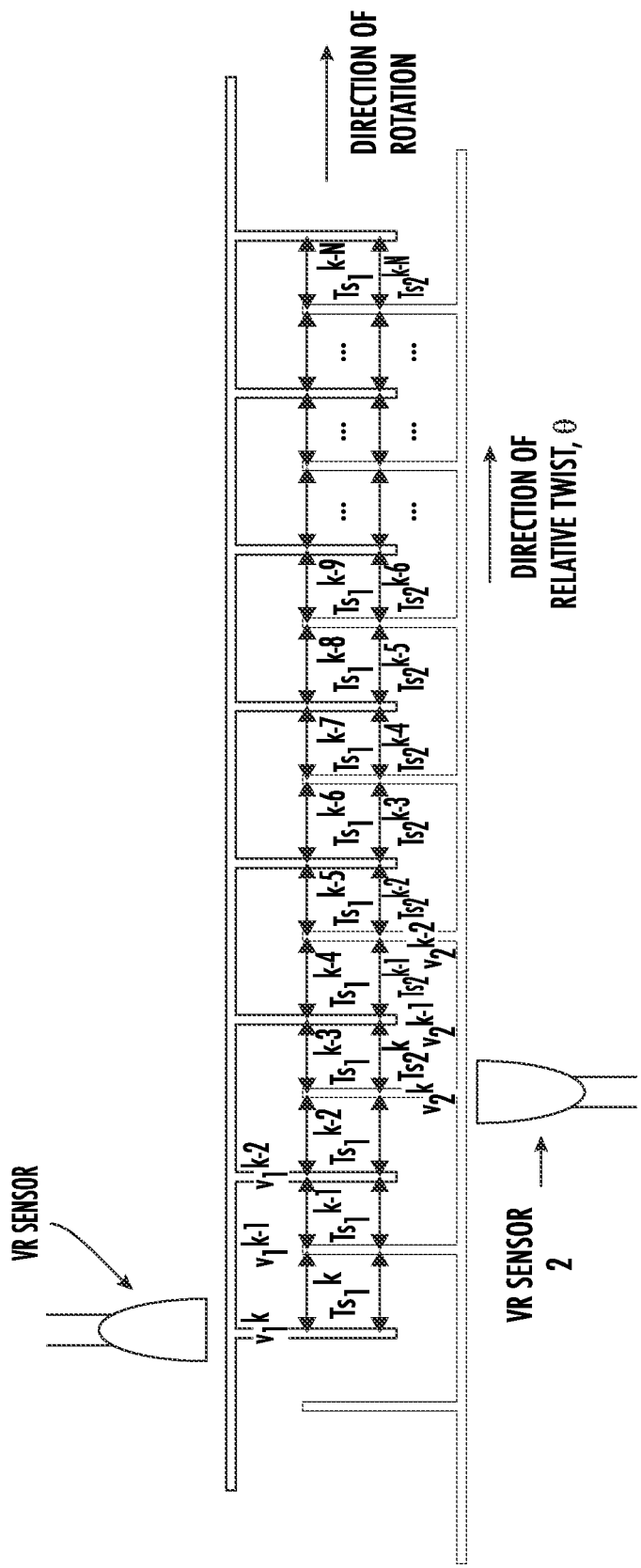
FIG. 24 is a diagram showing an unraveled set of targets passing two VR sensors.

FIG. 24 is a diagram showing an unraveled set of targets passing two VR sensors. In the example shown in FIG. 24, the instant in time that each tooth passes ($v^k$) can be written as the following (note that this is now a vector quantity representing two sensors):

$$\begin{bmatrix} v_1^k \\ v_2^k \end{bmatrix} = \begin{cases} \begin{bmatrix} 1 \\ 1 \end{bmatrix} \frac{f_{clock}}{N} \int_0^k \frac{dk'}{f_{shaft}^{k'}} + \frac{f_{clock}}{f_{shaft}^k} \frac{1}{2\pi} \begin{bmatrix} \theta \\ 0 \end{bmatrix} & \text{(where } k \text{ is odd)} \\ \begin{bmatrix} 1 \\ 1 \end{bmatrix} \frac{f_{clock}}{N} \int_0^k \frac{dk'}{f_{shaft}^{k'}} + \frac{f_{clock}}{f_{shaft}^k} \frac{1}{2\pi} \begin{bmatrix} 0 \\ \theta \end{bmatrix} & \text{(where } k \text{ is even)} \end{cases}$$

Where $f_{clock}$ is the clock speed of the timing measurement, N is the total number of teeth, k is the discrete index in time, and $f_{shaft}$ is the shaft speed at time instant k, and $\theta$ is the shaft twist. This can be further simplified if the shaft speed, is $f_{shaft}$, roughly constant over the small time interval between teeth.

$$\begin{bmatrix} v_1^k \\ v_2^k \end{bmatrix} = \begin{cases} \begin{bmatrix} 1 \\ 1 \end{bmatrix} \frac{f_{clock}}{N} \frac{k}{f_{shaft}} + \frac{f_{clock}}{f_{shaft}} \frac{1}{2\pi} \begin{bmatrix} \theta \\ 0 \end{bmatrix} & \text{(where } k \text{ is odd)} \\ \begin{bmatrix} 1 \\ 1 \end{bmatrix} \frac{f_{clock}}{N} \frac{k}{f_{shaft}} + \frac{f_{clock}}{f_{shaft}} \frac{1}{2\pi} \begin{bmatrix} 0 \\ \theta \end{bmatrix} & \text{(where } k \text{ is even)} \end{cases}$$

The timing value between the two sensors, denoted $dab^k$, can be written as the following (with shaft speed $f_{shaft}$ assumed to be constant) and is a measurement of twist:

$$dab^k = v_1^k - v_2^k = (-1)^k \frac{f_{clock}}{f_{shaft}} \frac{-\theta}{2\pi}$$

Note that the final result of this equation applies to all discrete indices of k. The effect of twist on an interleaved pattern of teeth results in a timing change that is an alternating positive and negative value of twist; this pattern repeats every revolution. A series of digital filtering can therefore isolate the twist. The twist over an entire revolution can be calculated by adding and subtracting all of the timing values. This equation forms the basis of the filtering coefficients for the digital filter 1602 for isolating twist with two sensors.

$$\sum_{n=0}^{n=N-1} (-1)^n dab^{k-n}$$
$$= dab^k - dab^{k-1} + dab^{k-2} - dab^{k-3} + \ldots + dab^{k-N-2}$$
$$- dab^{k-N-1}$$
$$= -\frac{f_{clock}}{f_{shaft}} \frac{\theta}{\pi} \frac{N}{2}$$

However, in experimental testing, radial motion effects did cause slight phase shifts in the VR sensor Zero-Crossing measurement. The above calculation is a raw twist measurement that requires some adjustment as the target wheel moves radially, this allows a correction of the twist accuracy to levels that are sub 0.004 degrees accurate. This radial correction factor can be isolated by looking at an individual target passing both sensors.

The timing value between the two sensors looking at one side of targets, denoted $dabz1^k$, can be written as the following (with shaft speed $f_{shaft}$ assumed to be constant):

$$dabz1^k = v_1^k - v_2^{k-1} = v_1^k - v_2^k z^{-1} = \frac{f_{clock}}{N f_{shaft}}$$

Note that this value should remain constant, however, in practice the value changes as the radial position of the shaft or sensor changes, because of this observed fact, this value can be used to compensate the twist measurement and provide a more accurate torque value. This equation forms the basis of the filtering coefficients for the digital filter 1604 for isolating radial motion with two sensors. Filtering over a revolution gives the following relationship:

$$DABZ1^k = \left| \frac{1}{N} \sum_{n=0}^{n=N-1} dabz1^{k-n} \right|$$

In practice, a more accurate twist measurement can be calculated with the following relationship:

$$\theta_{comp}^k = \theta_{raw}^k - G \times \frac{2\pi f_{shaft}}{f_{clock}} DABZ1^k$$

Where G is a scalar value or lookup table that depends on any of the following values: shaft speed, temperature, or the value of $DABZ1^k$ (if it ends up being a non-linear relationship). In practice, this compensated value of $\theta$ should be filtered down to a lower bandwidth with an anti-aliasing filter, $F_{AA}$; it is also helpful to apply a calibration offset $\theta_0$ to adjust for any real world imperfections in the amount of twist.

$$\theta = F_{AA} |\theta_{comp}^k| - \theta_0$$

Exactly as before, the shaft torsional stiffness, K, can be multiplied in to determine torque, T:

$$T=K(\theta-\theta_0)$$

Figure 25:
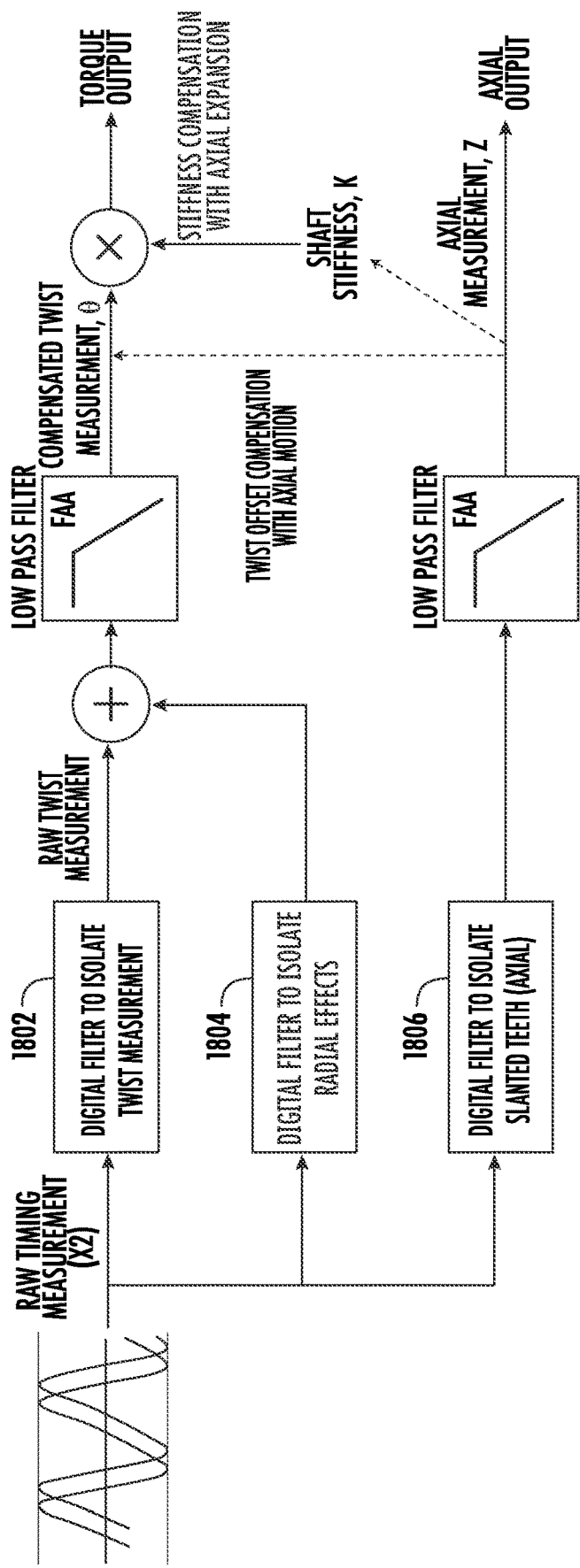
FIG. 25 is a signal processing diagram for an example system using dual sensors and axial/slanted teeth to output torque.

Similar to previous concepts, Axial (or other) motions can be measured by incorporated slanted teeth with a single sensor. This process can also be followed with a two sensor setup where the axial measurement can be used to further compensate the dual sensor twist measurement by providing an additional calibration offset for the twist measurement, θ, and/or providing an alternate measurement to temperature for compensating the stiffness, K. FIG. 25 is a signal processing diagram for an example system using dual sensors and axial/slanted teeth to output torque. The system includes a digital filter 1802 to isolate a twist measurement, a digital filter 1804 to isolate radial effects, and a digital filter 1806 to isolate axial effects.

Figure 26:
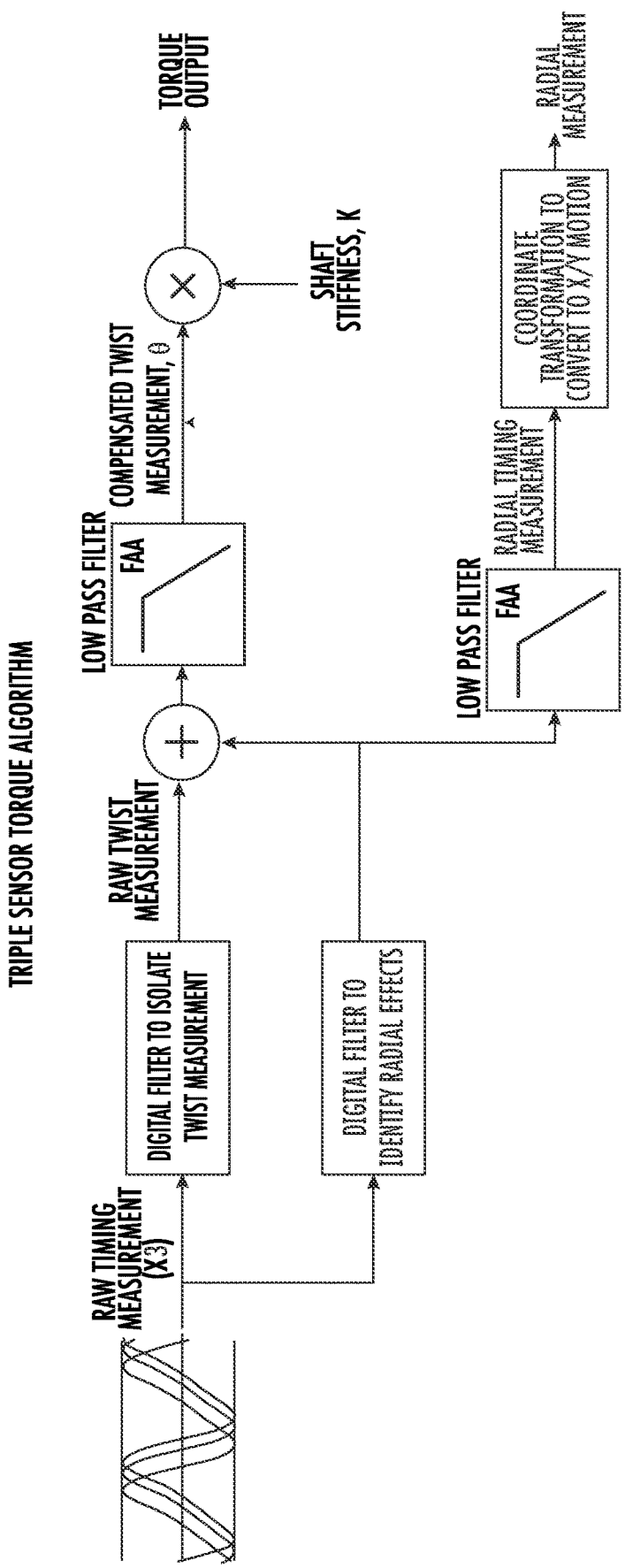
FIG. 26 is a signal processing diagram for an example system using three sensors.

Similar to the dual sensor torque concept with straight teeth, three sensors can be used to determine a more accurate torque. With three sensors, the exact x/y position of the shaft or cradle can be ascertained. This also allows a slightly more accurate compensation of the twist measurement, θ. For example, U.S. Pat. No. 7,093,504 describes methods for determining x/y motion from three sensors. U.S. Pat. No. 7,093,504 is hereby incorporated by reference in its entirety. FIG. 26 is a signal processing diagram for an example system using three sensors.

Figure 27:
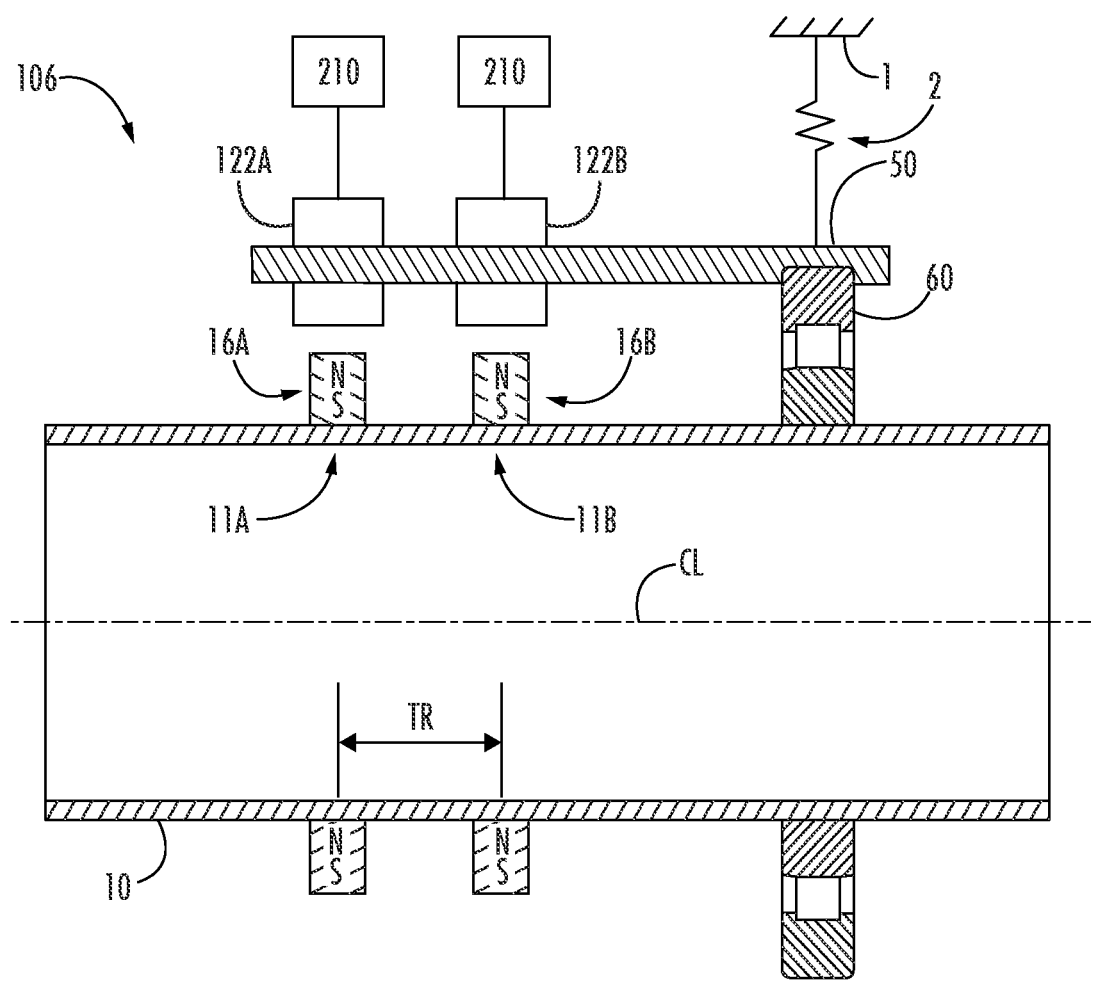
FIG. 27 is a cross-sectional view of an example embodiment of a system for sensing torque transmitted through a rotatable shaft via a sensor configured to detect a magnetic field generated by a set of magnets circumferentially arranged about the shaft to co-rotate with the shaft.
Figure 28:
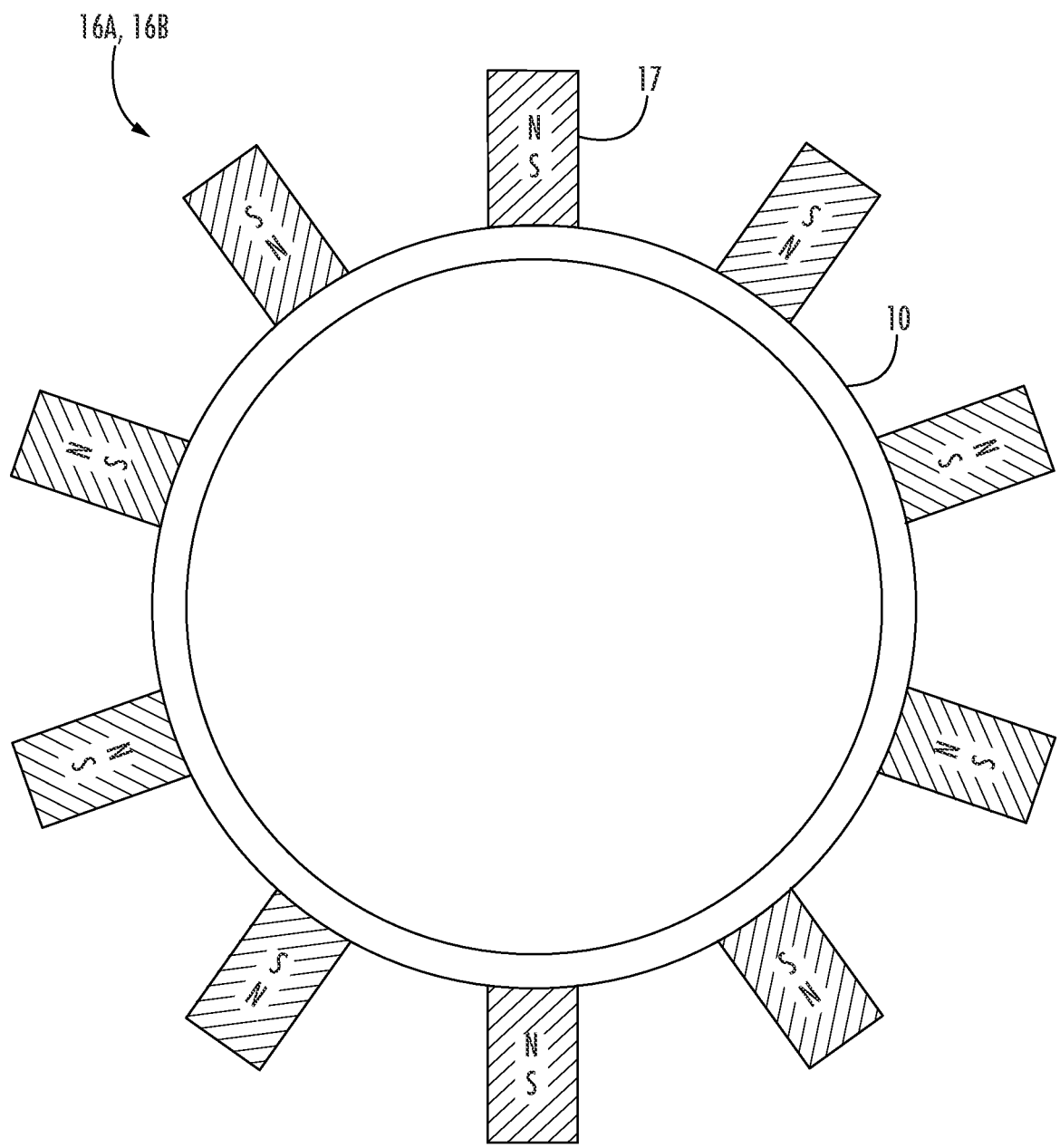
FIG. 28 is a cross-sectional view of the example embodiment shown in FIG. 27, taken through the plane defined by the first set of magnets.

FIGS. 27 and 28 show various aspects of another example embodiment of a system, generally designated 106, for sensing torque transmitted through a rotatable shaft 10. As shown, the system 106 is generally similar to the system 105 shown in FIG. 18, in that magnetic field sensors 122A, 122B are used to detect phase shifts in a magnetic field while the shaft 10 is rotating. However, unlike in system 105, in system 106, the magnetic field is generated by a plurality of magnets arranged circumferentially about the outer surface of the shaft 10. The magnets are arranged as a first set of magnets 16A, which are attached to the shaft 10 at a first position 11A and are positioned adjacent to (e.g., in a position so that the magnetic field produced is detectable by) the first magnetic field sensor 122A, and as a second set of magnets 16B, which are attached to the shaft at a second position 11B and are positioned adjacent to (e.g., in a position so that the magnetic field produced is detectable by) the second magnetic field sensor 122B. As the shaft 10 transmits a torque therethrough, the shaft 10 will torsionally deform (e.g., twist) in the target region TR, defined as between the first position 11A and the second position 11B. As such, during torsional deformation of the shaft 10, the magnetic fields produced by the first and second sets of magnets 16A, 16B will be offset from each other, relative to the magnetic fields present when the shaft is not twisted. This offset in magnetic fields produced by the first and second sets of magnets 16A, 16B, as detected by the first and second magnetic field sensors 122A, 122B, can be referred to as a phase shift, the phase shift being proportional to the magnitude of torsional deformation (e.g., twist) of the shaft 10.

As is shown in FIG. 28, the magnets 17 are arranged circumferentially about the outer surface of the shaft 10, with the polarity of the magnets 17 alternating in the circumferential direction of the shaft 10 (e.g., such that the polarity of each magnet 17 is different, or opposite, from the polarity of each adjacent magnet 17). In some embodiments, the magnets 17 can be integrated into the shaft 10 and/or attached to an inner surface thereof. In the example embodiment shown in FIG. 28, the magnets 17 are spaced equally about the perimeter of the shaft 10, however the magnets 17 may be spaced apart from each other in any pattern. In some embodiments, the spacing pattern of the magnets of the first set of magnets 16A is substantially identical to the spacing pattern of the magnets of the second set of magnets 16B. In some embodiments, the spacing pattern of the magnets of the first set of magnets 16A is substantially similar to, but circumferentially offset from, the spacing pattern of the magnets of the second set of magnets 16B. In some embodiments, the spacing pattern of the magnets of the first set of magnets 16A is different from the spacing pattern of the magnets of the second set of magnets 16B. In another example embodiment, the magnets 17 may be formed as all or a portion of a ring of magnets around the circumference of the shaft 10. For example, the magnets of the first set of magnets 16A can be interleaved (e.g., in an alternating pattern, or any other suitable pattern) with the magnets of the second set of magnets 16B. In some such embodiments, each of the magnets of the first set of magnets 16A can be directly adjacent to (e.g., in direct contact with, such as in the circumferential direction) correspondingly adjacent magnets of the second set of magnets 16B, such that the magnets 17 form a substantially continuous and uninterrupted ring of magnets about the circumference of the shaft 10. In some such embodiments, each magnet 17 has a different (e.g., reverse, or opposite) polarity from magnets 17 immediately adjacent thereto.

Figure 29:
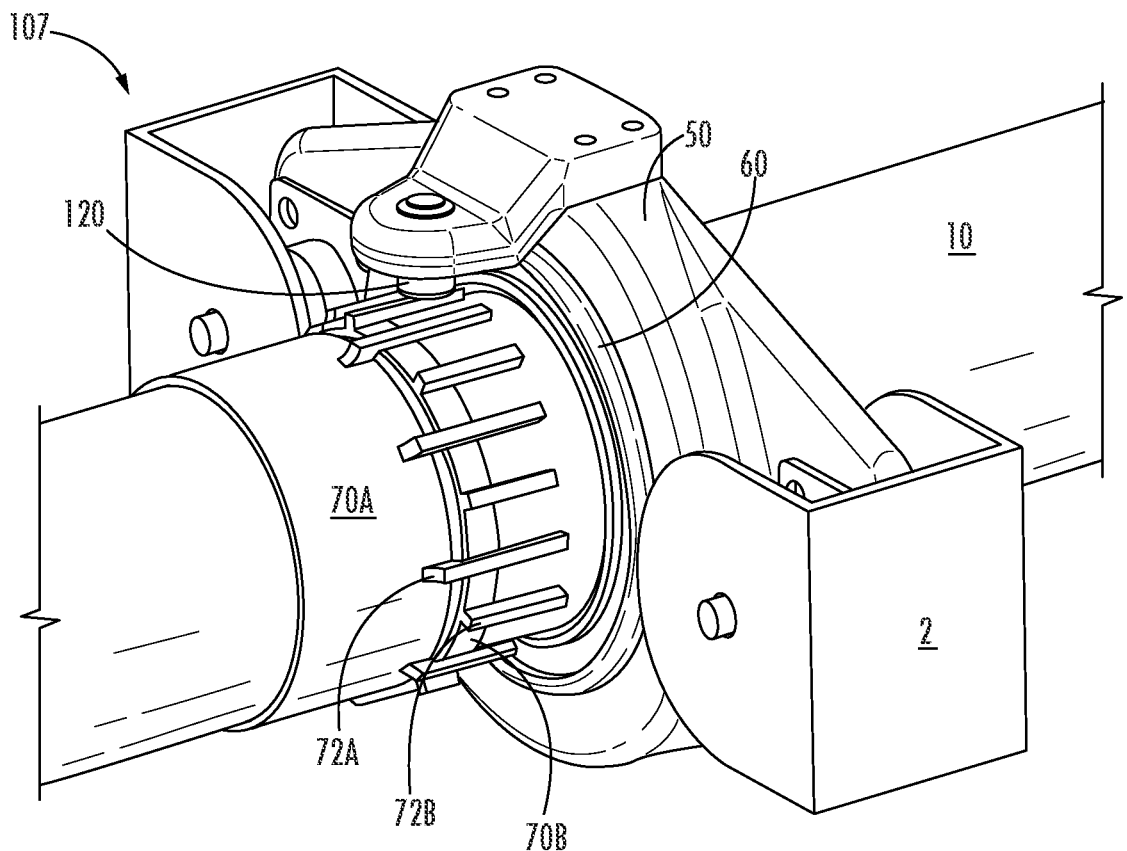
FIG. 29 is an isometric view of an alternative embodiment of the system shown in FIG. 10, in which the interleaved target elements are extended towards the bearing to be proximate the sensors.

FIG. 29 is an alternative example embodiment of the system 105 shown in FIG. 18, but in which the first and second annular rings 70A, 70B are axially spaced apart from the position of the bearing 60, with the target elements 72A, 72B extending in the longitudinal direction of the shaft 10 to be interleaved between each other (e.g., in an alternating pattern) in a plane defined by the sensor 120. As such, the first targets 72A have a longer length than the second targets 72B, such that the first and second targets 72A, 72B terminate in a same plane, at or beyond the axial position of the sensor 120 in the longitudinal direction of the shaft 10. As such, this example embodiment allows for measuring torque across a target region of a shaft 10 spaced apart from the bearing 10 in the longitudinal direction of the shaft 10. Otherwise, the system 107 is substantially identical to the system 105.

The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

The invention claimed is:

1. A system for sensing torque in a rotatable shaft, the system comprising:
   a target region extending along at least a portion of a length of the shaft, the target region comprising a first set of target elements and a second set of target elements, each of which are arranged about the shaft in a circumferential direction thereof, wherein the first set of target elements are on an outer surface of the shaft at a first position and the second set of target elements are attached to the outer surface of the shaft at a second position;
   a first sensor and a second sensor, which are configured to measure a circumferential distance between adjacent target elements of the first and second sets of target elements, wherein the distance measured between the adjacent target elements is used to calculate torque transmitted through the shaft over the target region;

a bearing having an inner race and an outer race, the inner race being supported by, and in contact with, the outer surface of the shaft, such that the inner race and the shaft are rotatably locked together;

a frame fixedly mounted to the outer race of the bearing, such that the frame maintains a substantially constant radial distance from the shaft; and a compliant mount attaching the frame to a fixed structure, such that the frame is configured to move substantially in unison with the shaft, relative to the fixed structure, in at least two dimensions, the at least two dimensions being in a plane perpendicular to a longitudinal axis of the shaft;

wherein the shaft is configured to rotate relative to the frame; and wherein the first and second sensors are rigidly attached to the frame, such that a gap between each of the first and second sensors and the outer surface of the shaft in the target region is substantially constant.

2. The system of claim 1, wherein:

the first set of target elements extend towards the second set of target elements, such that the first and second sets of target elements are interleaved with each other and at least a portion of each target element of the first set of target elements is positioned within a same plane as the second set of target elements; and the first and second sensors are fixedly positioned on a plane that is perpendicular to the longitudinal axis of the shaft and within an overlapping region of the first and second target elements, such that the first and second sensors measure the circumferential distance between the adjacent target elements of the first and second sets of target elements.

3. The system of claim 1, wherein the first and second sensors are spaced apart from each other circumferentially around the shaft.

4. The system of claim 1, wherein the compliant mount is configured such that the shaft, the bearing, and the frame are movable in at least three dimensions relative to the fixed structure.

5. The system of claim 1, wherein the first and second sensors are variable reluctance (VR) sensors.

6. The system of claim 5, wherein:

the first sensor is attached to the frame over the first position;

the second sensor is attached to the frame over the second position; and the system is configured to detect a change in relative position in the circumferential direction between the first and second sets of target elements induced upon torsional deformation of the shaft; or wherein the first position and the second position are spaced apart.

7. The system of claim 6, wherein:

the first sensor is rigidly attached to the frame, such that the first sensor is positioned over the first position;

a second bearing is attached to the shaft, adjacent the second position;

a second frame is mounted to the second bearing in a fixed manner, such that the second frame maintains a substantially constant radial distance from the shaft;

the second sensor is rigidly attached to the second frame, such that the second sensor is positioned over the second position; and the system is configured to detect a change in relative position in the circumferential direction between the first and second sets of target elements induced upon torsional deformation of the shaft.

8. The system of claim 7, wherein the bearing comprises an inner race and an outer race, the inner race being supported by, and in contact with, the outer surface of the shaft, such that the inner race of the second bearing and the shaft are rotatably locked together.

9. The system of claim 8, wherein:

the system comprises a second compliant mount that attaches the second frame to the fixed structure, such that the second frame is movable, substantially in unison with the shaft, relative to the fixed structure, in at least two dimensions, the at least two dimensions being in a plane perpendicular to the longitudinal axis of the shaft; or the second frame is attached to the fixed structure via the compliant mount, such that the second frame is movable, substantially in unison with the shaft, relative to the fixed structure, in at least two dimensions, the at least two dimensions being in a plane perpendicular to the longitudinal axis of the shaft.

10. The system of claim 6, wherein the first position and the second position are spaced apart by a majority of a length of the shaft.

11. The system of claim 1, wherein the bearing comprises a redundant bearing.

12. The system of claim 1, wherein:

the first set of target elements comprise magnets that are attached to the outer surface of the shaft at the first position and are spaced about the shaft in the circumferential direction such that adjacent magnets of the first set of target elements have different polarities from each other;

the second set of target elements comprise magnets that are attached to the outer surface of the shaft at the second position and are spaced about the shaft in the circumferential direction such that adjacent magnets of the second set of target elements have different polarities from each other;

the first and second positions are spaced apart, within the target region, from each other along the longitudinal axis of the shaft;

the first sensor is arranged at the first position to detect a magnetic field produced by the magnets of the first set of target elements;

the second sensor is arranged at the second position to detect a magnetic field produced by the magnets of the second set of target elements; and the system is configured to determine, based on a relative phase shift of the magnetic fields produced by the magnets of the first and second sets of target elements due to a torsional deformation of the shaft between the first and second sets of target elements, respectively, the torque being transmitted through the rotatable shaft.

13. The system of claim 12, wherein:

the magnets of the first set of target elements are adjacent to each other to form a ring of magnets about the shaft at the first position; and/or the magnets of the second set of target elements are adjacent to each other to form a ring of magnets about the shaft at the second position;

or wherein:
- the magnets of the first set of target elements are in direct contact with each other to form a substantially continuous and uninterrupted ring of magnets about the shaft at the first position; and/or
- the magnets of the second set of target elements are in direct contact with each other to form a substantially continuous and uninterrupted ring of magnets about the shaft at the second position.

14. A method for sensing torque in a rotatable shaft, the method comprising:
- providing a target region extending along at least a portion of a length of the shaft, the target region comprising a first set of target elements and a second set of target elements, each of which are arranged about the shaft in a circumferential direction thereof, wherein the first set of target elements are on an outer surface of the shaft at a first position and the second set of target elements are attached to the outer surface of the shaft at a second position;
- attaching a bearing to the shaft, the bearing having an inner race and an outer race, wherein the inner race is supported by, and in contact with, the outer surface of the shaft, such that the inner race and the shaft are rotatably locked together;
- mounting a frame to the outer race of the bearing in a fixed manner, such that the frame maintains a substantially constant radial distance from the shaft;
- attaching, via a compliant mount, the frame to a fixed structure, such that the frame is movable, substantially in unison with the shaft, relative to the fixed structure, in at least two dimensions, the at least two dimensions being in a plane perpendicular to a longitudinal axis of the shaft;
- rigidly attaching a first sensor to the frame, such that a gap between the first sensor and the outer surface of the shaft in the target region is substantially constant;
- rigidly attaching a second sensor to the frame, such that a gap between the second sensor and the outer surface of the shaft in the target region is substantially constant; and
- using the first and second sensors to measure a circumferential distance between adjacent target elements of the first and second sets of target elements, wherein the distance measured between the adjacent target elements is used to calculate a torque transmitted through the shaft over the target region.

15. The method of claim 14, wherein:
- the first set of target elements extend towards the second set of target elements, such that the first and second sets of target elements are interleaved with each other and at least a portion of each target element of the first set of target elements is positioned within a same plane as the second set of target elements; and
- the first and second sensors are fixedly positioned on a plane that is perpendicular to the longitudinal axis of the shaft and within an overlapping region of the first and second target elements, such that the first and second sensors measure the circumferential distance between the adjacent target elements of the first and second sets of target elements.

16. The method of claim 14, wherein the first and second sensors are variable reluctance (VR) sensors.

17. The method of claim 16, wherein:
- the first sensor is attached to the frame over the first position; and
- the second sensor is attached to the frame over the second position; and
- a change in relative position in the circumferential direction is detected between the first and second sets of target elements induced upon torsional deformation of the shaft.

18. The method of claim 16, wherein the first position and the second position are spaced apart.

19. The method of claim 18, wherein the first position and the second position are spaced apart by a majority of a length of the shaft.

* * * * *